(12) United States Patent
Kuperman et al.

(10) Patent No.: US 12,021,880 B2
(45) Date of Patent: *Jun. 25, 2024

(54) PROTECTION CONFIGURATION FOR APPLICATION PROGRAMMING INTERFACES

(71) Applicant: Oracle Systems Corporation, Redwood Shores, CA (US)

(72) Inventors: Leon Kuperman, Tarzana, CA (US); Jose Hernandez, North Miami, FL (US)

(73) Assignee: ORACLE SYSTEMS CORPORATION, Redwood Shores, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/574,190

(22) Filed: Jan. 12, 2022

(65) Prior Publication Data

US 2022/0141233 A1 May 5, 2022

Related U.S. Application Data

(63) Continuation of application No. 15/933,105, filed on Mar. 22, 2018, now Pat. No. 11,245,706.

(Continued)

(51) Int. Cl.
*H04L 9/32* (2006.01)
*G06F 8/30* (2018.01)
(Continued)

(52) U.S. Cl.
CPC ............. *H04L 63/123* (2013.01); *G06F 8/30* (2013.01); *G06F 21/33* (2013.01); *G06F 21/602* (2013.01);
(Continued)

(58) Field of Classification Search
CPC ... H04L 9/3213; H04L 63/08; H04L 63/0807; H04L 63/0876; H04L 63/0884; G06F 8/30; G06F 21/602; G06F 21/629
See application file for complete search history.

(56) References Cited

U.S. PATENT DOCUMENTS 7,395,311 B2 * 7/2008 Kaler .................. H04L 63/0435
709/203
7,860,888 B2 12/2010 Buchholz et al.
(Continued)

OTHER PUBLICATIONS

U.S. Notice of Allowance dated Aug. 30, 2022 from co-pending U.S. Appl. No. 17/123,364, filed Dec. 16, 2020.
(Continued)

*Primary Examiner* — Daniel B Potratz
(74) *Attorney, Agent, or Firm* — Kraguljac Law Group, LLC

(57) ABSTRACT

A system is configured to authorize client access to an application programming interface (API) of a host device. A proxy is configured to handle network traffic between a host and a client device. The system determines that an API request lacks a form of authentication including a token where the first API request cannot be authenticated. The API request is denied, and a challenge is transmitted to the client device. A subsequent API request from the client device is determined to include a presented token as the form of authentication. The presented token of the second API request is verified based on attributes of the presented token. The system permits the second API request in response to the presented token being verified. An IP-token pair is stored and the permitted second API request is transmitted to the host device for servicing.

19 Claims, 9 Drawing Sheets

Related U.S. Application Data

(60) Provisional application No. 62/477,286, filed on Mar. 27, 2017.

(51) Int. Cl.

| | | |
|---|---|---|
| *G06F 21/33* | (2013.01) | |
| *G06F 21/60* | (2013.01) | |
| *G06F 21/62* | (2013.01) | |
| *H04L 9/40* | (2022.01) | |
| *H04W 12/069* | (2021.01) | |
| *H04W 12/08* | (2021.01) | |
| *H04W 12/122* | (2021.01) | |

(52) U.S. Cl.
CPC .......... *G06F 21/629* (2013.01); *H04L 9/3213* (2013.01); *H04L 9/3234* (2013.01); *H04L 9/3236* (2013.01); *H04L 9/3239* (2013.01); *H04L 9/3271* (2013.01); *H04L 63/0281* (2013.01); *H04L 63/0807* (2013.01); *H04L 63/0884* (2013.01); *H04L 63/10* (2013.01); *H04L 63/101* (2013.01); *H04L 63/108* (2013.01); *H04W 12/069* (2021.01); *H04W 12/08* (2013.01); *H04W 12/122* (2021.01); *H04L 2463/121* (2013.01)

(56) References Cited

U.S. PATENT DOCUMENTS

| | | | |
|---|---|---|---|
| 8,800,011 B2 | 8/2014 | Bray et al. | |
| 9,595,023 B1 | 3/2017 | Hockey et al. | |
| 9,755,886 B2 | 9/2017 | Ananda et al. | |
| 10,425,465 B1* | 9/2019 | Jha | H04L 67/565 |
| 2003/0014315 A1* | 1/2003 | Jaalinoja | G06Q 20/16 |
| | | | 705/18 |
| 2004/0162786 A1 | 8/2004 | Cross et al. | |
| 2016/0088092 A1* | 3/2016 | Cardona-Gonzalez | H04L 67/141 |
| | | | 709/227 |
| 2016/0277413 A1 | 9/2016 | Ajitomi et al. | |
| 2018/0234426 A1 | 8/2018 | Huang et al. | |
| 2018/0343309 A1 | 11/2018 | Mishra | |

OTHER PUBLICATIONS

Pramukantoro; Cloud-based Middleware for Syntactical Interoperability in Internet of Things; pp. 32-37; Journal of Information Technology and Computer Science, vol. 5, No. 1, Apr. 2020.

Hidayat et al.; Design of Restaurant Billing System (E Bill Resto) by Applying Synchronization of Data Billing in Branch Companies to Main Companies Based on Rest API; pp. 1-5; 2020 Intl. Conference on Smart Technology and Applications (ICoSTA).

Ju et al.; Online Data Access Control with Bluetooth Beacon for Digital Content Stores; pp. 1-5; Advances in Environmental Biology, 9(7) Special 2015) AENSI Journals.

U.S. Non-Final Office Action dated Mar. 30, 2020 from co-pending U.S. Appl. No. 15/933,127 filed Mar. 22, 2018.

Fotiou et al.; Access Control as a service for the Cloud., Journal of Internet Services and Applications, pp. 1-15 (2015).

Ullah et al.; TCLOUD: A Multi-Factor Access Control Framework for Cloud Computing. International Journal of Security and Its Applications, vol. 7, No. 2, Mar. 2013.

Ethelbert et al.; A Json Token-Based Authentication and Access Management Schema or Cloud SaaS Applications., pp. 1-7, 2017 IEEE 5th Intl. Conference on Future Internet of Things and Cloud.

Blundo et al.; A Framework for Authenticated Web Services., pp. 1-11, ECOWS (Year: 2004), Baronissi, Italy.

Wu et al.; Design and Implementation of Cloud API Access Control Based on OAuth., pp. 1-6, IEEE Xplore (Year: 2013), Tencon—Spring.

Huang et al.; A Token-Based User Authentication Mechanism for Data Exchange in RESTful APi., 2015 18th Intl. Conference on Network-Based Information Systems, pp. 1-6 IEEE (Year: 2015).

\* cited by examiner

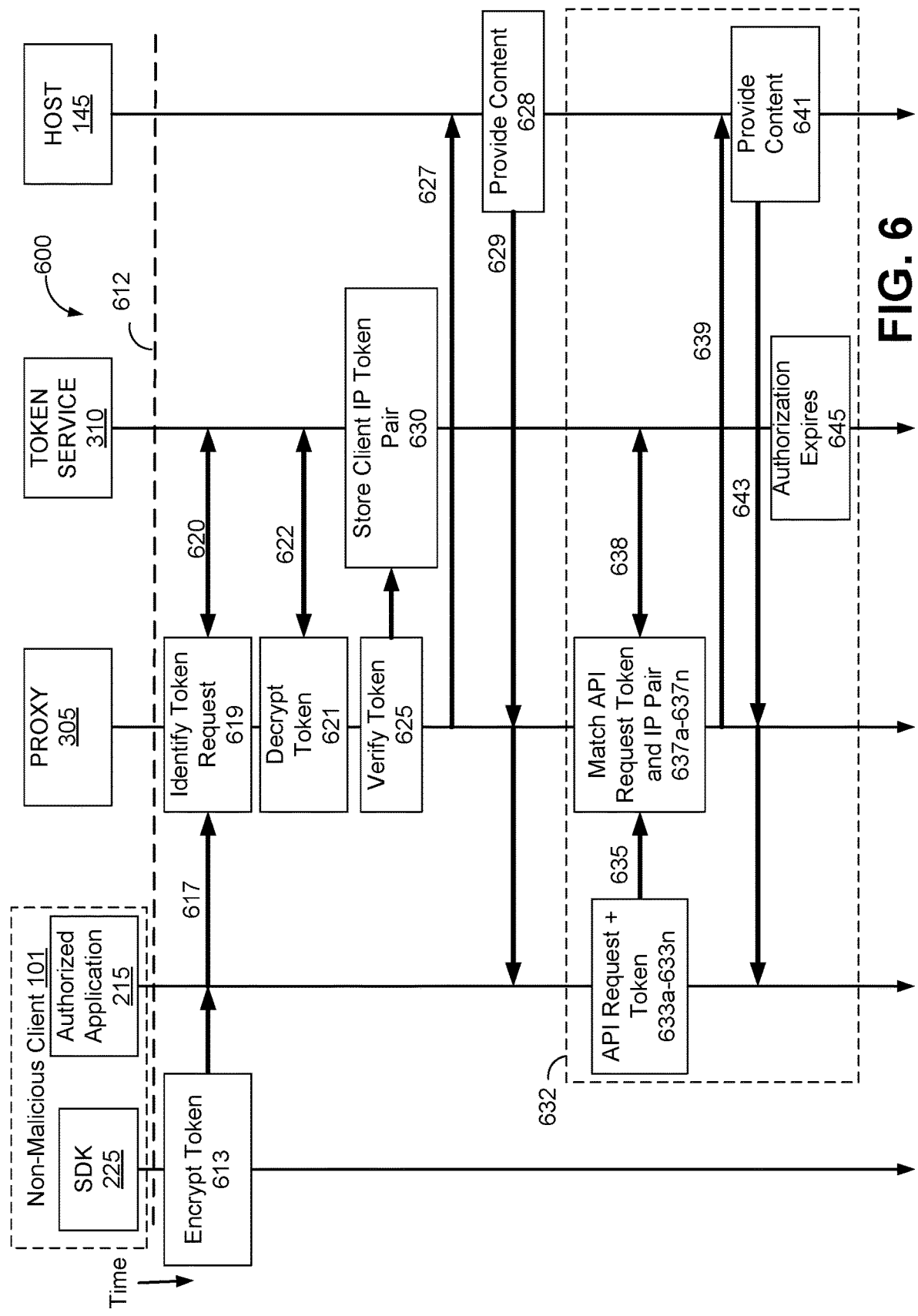

PROTECTION CONFIGURATION FOR APPLICATION PROGRAMMING INTERFACES

CROSS REFERENCE TO RELATED APPLICATIONS

This application claims the benefit of U.S. application Ser. No. 15/933,105, filed Mar. 22, 2018, which claims the benefit of U.S. Provisional Application No. 62/477,286, filed Mar. 27, 2017, which are both incorporated by reference herein in their entirety.

TECHNICAL FIELD

This disclosure generally relates to providing protection to application programming interfaces (APIs) of a host, and more specifically, to authenticating developer authorized client applications access to the API of the host while mitigating unauthorized access.

BACKGROUND

Internet enabled clients, such as smart phones, personal computers, tablets, gaming systems and the like have become prevalent in recent years. Given the proliferation of Internet enabled clients and far-reaching Internet access, an increasing number of users access online content which is hosted by servers, known as a host device, host server, or a host. A common method for providing online content to clients is through an application programming interface, or API, at the host. The vast majority of users access online content provided by hosts for legitimate reasons through authorized applications. However, there are illegitimate users who access the hosts of online content with unauthorized applications, whether to simply access the host for legitimate purposes through alternative means, or for more malicious purposes such as to scrape host data or to deny services to legitimate users. These activities may, at minimum, violate terms of service for utilizing an API and, at worst, impact legitimate user experience or deny revenue to the content provider.

Currently, techniques for protecting APIs from unauthorized access are limited because client-host communications associated with APIs are typically occur over lightweight data-interchange formats such as WebSocket or WebSocket API (WebSocket or WebSockets, collectively), JavaScript Object Notation (JSON) or eXtensible Markup Language (XML). While the use of these lightweight formats provides an efficient client-host communication scheme, protection options for APIs are very limited because traditional protection methods for features and functionality provided by a host rely on monitoring client activity through fully featured interchange formats. Additionally, with respect to WebSockets, there is a host resource cost to maintain an open WebSocket on a per-user basis, which illegitimate users may exploit. Fully featured interchange formats allow for more granular client identification than just an internet protocol (IP) address level as is generally possible with a lightweight data-interchange format. Thus, current protection schemes for protecting APIs are mainly IP level rate limiting rules that set a number of requests over time period threshold. IP level rate limiting provides some benefit in increasing the time it takes to scrape a host or mitigating a denial of service type attack from a single IP. However, IP level rate limiting may also severely impact legitimate users that share a same IP address as illegitimate users (e.g., when accessing a network from a same megaproxy, Internet Service Provider, network access point etc.). Moreover, aside from blocking an IP address itself (e.g., preventing access by the IP address), which captures both legitimate users and illegitimate users alike in the block, rate limiting does little to restrict unauthorized access as it only increases the amount of time it takes to scrape a host.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

FIG. 6 illustrates an example event trace for authenticating client access to an API of a host with a proxy and token service, according to an example embodiment.

DETAILED DESCRIPTION

Figure 1:
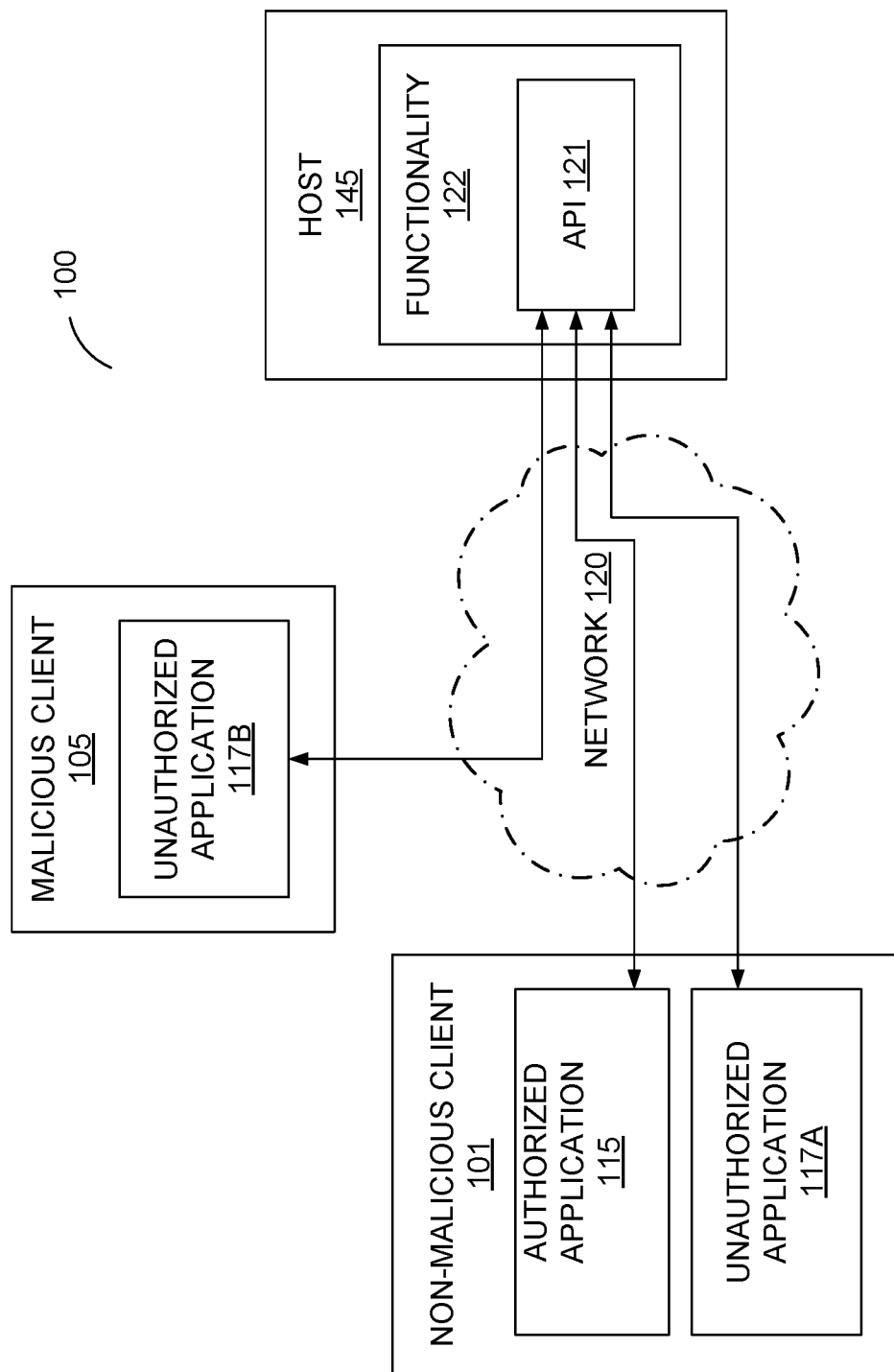
FIG. 1 illustrates a block diagram of an example communications environment of a host and clients, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A system (and/or method and/or non-transitory computer readable storage medium storing computer program code (e.g., comprised of instructions)) may be configured for authorizing client device (or client) access to an application programming interface (API) of a host device (or host).

Example embodiments described herein include a proxy device (or proxy), such as a Hypertext Transfer Protocol (HTTP)/HTTP over Secure Socket Layer (SSL) or Transport Layer Security (TLS) (collectively referred to as (HTTPS)) proxy server, configured to handle network traffic between at least one host and one or more clients. In some embodiments, HTTP (i.e., HTTP 1.1) may be utilized to open a WebSocket for client-proxy communications, the WebSocket enables the proxy to push data (e.g., from the API) for application layer features and functionality of the host to the client. One example use of a WebSocket for client-proxy communications is to push real-time data such as stock prices and trading data to client applications. Clients engage the host through the proxy to access application layer features and functionality of the host, such as an API. For example, a client may generate a request to the API of the host for content on the host. Oftentimes, these requests are initiated by a client-side application over HTTP with lightweight data-interchange formats such as WebSocket or WebSocket API (WebSocket or WebSockets, collectively), JavaScript Object Notation (JSON) or eXtensible Markup Language (XML). For example, a client may request a WebSocket with an HTTP 1.1 request to upgrade to WebSockets for communications with a host API, or otherwise request host API data using JSON or XML code or text. Accordingly, unlike requests for other features and functionality that are often provided by the host, requests for content provided by APIs are typically not Hypertext Markup Language (HTML) requests nor does the client-side application necessarily have full web browser application capabilities such as having JavaScript enabled, as would be the case with a typical web browser. As a result, options for the proxy to monitor API request activities of a client beyond raw request metrics (e.g., number and rate) at the IP level using traditional techniques are severely limited.

In order to assist the proxy in authorizing client access to an API of the host, a software development kit (SDK) is incorporated in an authorized client-side application distributed to users. For example, a user may utilize a client to download the authorized client-side application associated with a particular service provided by the host from an application store, the host, or elsewhere, and install the authorized application to their client. When the user utilizes the authorized application, the authorized application may initiate one or more requests to the API at the host for online content or data to provide information and functionality to the user. The SDK is configured to generate a token that is provided in association with one or more of the API requests initiated by the authorized application. Additionally, the SDK may be configured to generate a token that is provided in association with one or more API requests that request a WebSocket for host API access. For example, the SDK may include a public encryption key and encrypt information about the client, user, and/or other data to generate a token unique to the client/user. In turn, the SDK and/or authorized application may set an HTTP header of an API request with the token (e.g., attributes of the token which may be represented by one or more values) to include (e.g., present) the token with the API request.

As the proxy handles traffic between the client and host, the proxy monitors for API requests received from clients. The proxy may distinguish between tokened requests and non-tokened requests for the API of the host according to the presence of a token or lack thereof, such as by checking the HTTP header of each API request for a token to determine whether the client presented a token with the API request. The term "token" is used herein to refer to a token and other form of authentication such as a credential, a security element, a unique identifier (UID) or other form of authentication that can be used to verify whether a client device (and its API request) is authorized to access the API of the host system. The terms "non-tokened request" and "lacks a token" refer to a request that does not include any form of authentication (does not include a token, a credential, or other form of authentication) that can be used by the system to verify and authenticate the API request. The proxy may also check the HTTP header of an API request for a request to open a WebSocket in addition to the presence of a token. Additionally, the proxy may verify a presented token that is provided with or included in an API request by a client, to authenticate the client in question. If the proxy verifies the token, the proxy considers the client authenticated and authorizes the client access to the API. The proxy permits an authenticated client access to the API of the host by passing received API requests from the authenticated client to the host. In some embodiments, the authentication and authorization permits the opening of a WebSocket that allows client access to the API of the host and the client to receive push data from the host API.

The proxy may verify a presented token (as the form of authentication) in association with an API request in a number of ways. For example, in various embodiments, the proxy may verify the presented token by decrypting the token with a corresponding private encryption key and determining whether the token is valid based on attributes of the token. In turn, if the token is verified based on the attributes of the token, the proxy may store an internet protocol (IP) address associated with the client in association with the verified token as a verified IP-token pair. The IP address associated with the client may be determined from the API request by looking at an HTTP request/response path for the API request (e.g., a source IP address of the API request/destination IP address for a response to the API request). Thus, when the proxy receives an API request from the client that includes an associated token, the proxy may determine whether the IP address associated with the client and the associated token match an existing verified IP-token pair. If there is a match, the proxy verifies the token without needing to proceed through the decryption of the token and verification of the token attributes because the client was previously authenticated to access the host API. If there is no matching pair, the proxy may verify the token directly as described previously. In some embodiments, if there is no matching pair, the proxy determines whether the token matches an existing token stored as part of an existing verified IP-token pair to ensure a same token cannot be used across multiple IP addresses. If there is no matching token, the proxy may verify the token directly as described previously. Otherwise the token is not verified. In some embodiments, the order of these determinations may differ, for example, the proxy may first determine whether a presented token matches an existing token and subsequently determine whether the IP address associated with the client matches the IP address associated with the existing matching token. In some embodiments, the proxy may make each determination discretely and utilize a function or truth table to determine whether to verify the presented token (quick) in response to an existing verified IP-token pair, not verify the token (quick) in response matching the token but not the client IP address with an existing verified IP-token pair, or verify the token directly (longer) based on token attributes in response to no existing token.

In contrast, for clients that are not (or cannot be) authenticated, such as when the client does not present any form of authentication (e.g., a token, a credential, a security element, etc.) for verification with an API request or if a form of authentication is presented with an API request but cannot be verified, the proxy denies these clients access to the API of the host. For example, the proxy may discard API requests received from clients that are not (or cannot be) authenticated. In some example embodiments, if a client does not present a token with an API request or if a presented token with an API request cannot be verified, the proxy may challenge the client to present a token/a new token. For example, the proxy may respond to the API request by challenging the client to present a token in a subsequent API request and discard the initial API request. In a specific example, the proxy may respond to an API request that is an HTTP 1.1 request for a WebSocket and does not include a token by challenging the client to present a token in a subsequent HTTP 1.1 request for a WebSocket prior to opening any WebSocket allowing API access in response to the request. Should the client fail to present a token in the subsequent API request, the proxy may similarly respond by again challenging the client and discard the subsequent API request and any additional subsequent API requests until the client presents a token. In some embodiments, a client may fail up to a certain number of challenges in a row before the proxy blocks the client. In an example embodiment, clients failing up to a configurable number of challenges in a row (e.g., 5-10) are blocked at the IP level and may be blocked for a configurable amount of time (e.g., 5-180 minutes, 1-24 hours, or 1+ days) as desired. For example, the IP address of a client failing X (e.g., 5) challenges in a row may be added to a blacklist maintained by the proxy and/or a downstream traffic routing device to prevent the processing of subsequent API requests received from the client. Adding the IP address of the client to a blacklist utilized by a downstream traffic routing device positioned between the client and proxy minimizes the amount of IP level blocking the proxy must perform to free up proxy resources for other tasks and bandwidth between the downstream device and the proxy. One example challenge is a non-standard HTTP response from the proxy, which the SDK of an authorized application may listen for as a trigger to generate a token, or be called by the authorized application to generate a token in response to receipt thereof, depending on the embodiment. In turn, the token is set in an HTTP header of a subsequent API request (e.g., due to the reinitiating of the denied API request or other next API request) such that the proxy may authenticate the client and permit the subsequent API request. API requests permitted by the proxy are passed or transmitted to the host for servicing and/or a WebSocket is opened to permit API access (e.g., API request/request and/or push data) over WebSocket.

Unauthorized API Access

Turning now to FIG. 1, it illustrates a block diagram of an example communications environment 100 of a host and clients, according to one embodiment. The environment 100 may include one or more client devices (or clients) 101, 105 and at least one host device (or host) 145, all of with may have the ability to inter-communicate via a network 120.

The network 120 may be a communication network that transmits data between one or more of the client devices 101, 105 and host 145. In one example embodiment, the network 120 is the Internet. While only one network 120 is shown, nefarious entities such as malicious clients 105 (although only one is shown) may communicate and/or be controlled by an overlay network (e.g., a darknet) and/or auxiliary network using specific software, custom protocols, etc. for one or more of their communications. For example, the malicious client 105 may be a constituent client of a botnet comprising many malicious clients whose activities may be controlled, at least in part, by a control server device managing the botnet. Example embodiments may include many hosts 145, non-malicious clients 101 and malicious clients 105.

In one example embodiment the network 120 may include wireless network and/or wired network. In one embodiment, the network 120 uses standard communications technologies and/or protocols. Thus, the network 120 may enable communications using, for example, technologies such as Ethernet, 802.11, integrated services digital network (ISDN), digital subscriber line (DSL), asynchronous transfer mode (ATM), etc. Similarly, the networking protocols used on the network 120 can include, for example, the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), WebSocket or Websocket API (Websocket or WebSockets, collectively), Java Script (Java), Asynchronous Java Script (AJAX), the extensible markup language (XML), JavaScript Object Notation (JSON), etc. In addition, all or some of links can be encrypted using conventional encryption technologies such as the secure sockets layer (SSL), Secure HTTP (HTTPS) and/or virtual private networks (VPNs). In another example embodiment, the entities may use custom and/or dedicated data communications technologies instead of, or in addition to, the ones described above. For example, nefarious entities can also utilize a network 120 of dedicated or private communications links that are not necessarily part of the Internet but may overlay and utilize one or more network 120 components. In another example, clients may utilize provided network access points such as by an Internet Service Provider or Cellular Provider (Service Provider) to transmit and receive data over the network 120. Thus, a service provider may implement and manage a wireless or wired access point and associated infrastructure to provide client devices or users of the client devices access to the network 120 through a paid service.

In example embodiments described herein the host 145 may be a computing device (e.g., a server) or collection thereof including online functionality 122 for providing dynamically generated web content, database resources, search index resources, ecommerce components, application programming interface (API) endpoints 121 and the like to clients over the network 120. Thus, the host 145 may transmit and receive data packets over the network 120. A server-side API (e.g., host 145 server API 121) is a programmatic interface comprising one or more publicly exposed endpoints (e.g., to clients 101, 105 over network 120) with a defined request-response message system, often expressed in lightweight data-interchange formats such as WebSockets, JSON or XML. The API 121 may be exposed to clients 101, 105 via the network 120, e.g., where the host 145 is often an HTTP-based web server providing online functionality 122. The host 145 receives API requests from clients 101, 105 for functionality 122 of the host provided by the API 121. In turn, the host 145 processes a request to the API 121 to generate a host response including content and/or data on the host 145 and/or one or more external databases and/or servers that was requested by the client via the API request. In some embodiments, host 145 API 121 data may be exchanged with a client over a WebSocket, which can include real-time data pushed to the client. The host 145 transmits the response the client to provide the requested host functionality 122 provided by the API 121.

In one example embodiment, a client, e.g., 101, 105, is a computing device with network capabilities for transmitting and receiving data packets over the network 120. The client devices 101, 105 may be wireless enabled mobile computing devices (e.g., laptops, netbooks, tablets, smart telephones, etc.) and/or wired and/or wireless home computing devices (e.g., a laptop, personal computer, media computer, etc.) and/or Internet of Things (IoT) devices (e.g., smart refrigerator, smart thermostat, or voice controlled device) that include applications or frameworks for accessing online data. Example applications for accessing online data include applications such as a web browser, command-line interfaces, widgets, mobile applications, utilities, etc., that request, send, and/or receive data over the network and may present received data to the user (e.g., as rendered web content, command-line text, weather forecast, sports scores, airline flight costs and/or times, etc.) or otherwise request, send and/or receive data for application function such as data for supporting online gaming.

In many instances, example authorized client-side applications 115 are standalone mobile applications and/or widgets authorized by a developer/company that rely on the API 121 of the host 145 managed by the developer/company to perform one or more functions and/or present data associated with a service provided to a user of the client. Examples of which include games, airline flight booking applications, companion media applications that provide traditional subscription-based media services over the internet (e.g., satellite radio, cable television programming, etc.), and others. Oftentimes, the developer/company wishes to restrict access to the API 121 to only those applications which they have authorized. However, because API requests are often initiated by client-side applications over HTTP with lightweight data-interchange formats such as WebSockets, JSON or XML, protection options for the API 121 of the host 145 are limited. Thus, unauthorized applications 117 may often access the API 121 of the host 145 even though the developer/company wishes to restrict API 121 access to only authorized applications 115.

By way of example, a user of a non-malicious client 101 may utilize an authorized application 115 for legitimate purposes to access functionality 122 associated with the host 145. For example, the authorized application 115 may initiate one or more API requests to a host 145 in order to retrieve data via the API 121 for presentation to the user and/or during the course of its operation. One example authorized application 115 may be a game that utilizes the API 121 to exchange real-time game data with the host 145 in order to generate events in the game and report event outcomes. Another authorized application 115 may be a stock market application that utilizes the API 121 to receive real-time stock data and exchange trading data (e.g., over a WebSocket) with the host 145 in order to view/purchase/sell stock at real-time market values. Another example authorized application 115 may be a flight booking application that utilizes the API 121 to retrieve flight information from the host 145 for viewing flight details and purchasing airline tickets. Another example authorized application 115 may be a companion media application that utilizes the API 121 to stream media from the host 145 over the network 120 which the user is a paid subscriber to another device/delivery scheme, such as satellite radio or cable television.

In some instances, a user of a non-malicious client 101 may utilize an unauthorized application 117A in a similar non-malicious fashion (e.g., a $3^{rd}$ party utility), but in violation of terms of service associated with the API 121 and/or authorized application 115 to similarly access the API 121 of the host 145. While the activities may be non-malicious, the use of an unauthorized application 117A may deny ad revenue or include functionality in violation of terms of service (e.g., ability to download a streamed video, music, etc.) that are otherwise not provided to users in the authorized application 115.

In another example, of greater concern, a user of a malicious client 105 may utilize an unauthorized application 117B for malicious purposes to initiate one or more API requests to a host 145 in order to scrape host data via the API 121, obtain services which the user does not pay for, or overwhelm the API with requests (e.g., denial of service). One example unauthorized application 117B may access the API 121 illegitimately for cheating in game events to gain advantage over other players. Another example unauthorized application 117B may maliciously access the API 121 to scrape the host 145 for airline ticket prices and flight details and list them on a separate $3^{rd}$ party service. Another example unauthorized application 117B may maliciously access the API 121 to stream media from the host 145 over the network 120 which the user is not a paid subscriber to, such as satellite radio or cable television. Another example unauthorized application 117B may maliciously initiate a large number of API requests (which oftentimes are requests to open WebSockets for API access to tie up host resources) to the API 121 of the host 145 in an attempt to divert host resources from legitimate users (e.g., in a denial of service attack). Another example unauthorized application 117B may maliciously initiate a large number of API requests with breached username/password pairs to the API 121 of the host 145 in order to gain access to a multitude of user accounts from lists of spilled credentials. In addition, example unauthorized applications 117B on a malicious client 105 may include malware either as a standalone process and/or process infecting the client, which may include or utilize an existing application and/or framework of the client to initiate illegitimate API requests to the host 145 (often as a constituent client of a botnet).

Protection options for the API 121 of the host 145 are often minimal because API requests are initiated by client-side applications 115, 117 over HTTP with lightweight data-interchange formats such as WebSockets, JSON or XML. Unlike requests for other functionality 122 a host 145 may provide, as would be the case with requests for content from a fully featured web browsing application, API requests for content provided by APIs are typically not Hypertext Markup Language (HTML) request nor do the client-side applications 115, 117 necessarily have full JavaScript enabled. Accordingly, the options for a host 145 or other device to verify the legitimacy of API requests, let alone limit multiple user/client access under a given user account are minimal to nonexistent. Thus, non-malicious clients 101 and malicious clients 105 (with relative ease) alike may generate API requests to the API 121 of the host 145 for retrieving content on the host regardless of intent. Therefore, there exists a need to better protect API endpoints Client Authentication for API Protection Turning now to FIG. 2, it illustrates a block diagram of an example communications environment 200 including a proxy 205 for authenticating client access to an API 121 of a host 145, according to one example embodiment. In addition to the proxy 205 and host 145, the environment 200 may also include non-malicious clients 101 and malicious clients 105 which communicate over network 120 with the host 145 through the proxy 205. Authentication of client access to the API 121 of the host 145 by the proxy 205 allows authorized applications 215 to access the API and mitigates access from unauthorized applications 117.

In one embodiment, the proxy 205 is positioned between the host 145 and the network 120, such that communications between clients 101, 105, and the host 145 flow through the proxy 205. In one embodiment, the proxy 205 is a standalone computing device, such as server, or collection thereof that handles traffic between the host 145 and the clients 101, 105. Thus, the proxy 205 may be a server, load balancer, router, or combination thereof located logically and/or physically between the clients 101, 105, the network 120, and/or host 145 to monitor and manage the request/response path between the clients and the host. In other example embodiments, the proxy 205 may be incorporated at the host 145 and logically process traffic (e.g., as a pre-processing filter) prior to traffic being processed by the host. In yet other example embodiments, one or more the features and functionality of the proxies discussed herein may be incorporated at the host 145 as one or more processes. For example, one or more of the processes of the proxy 205 may be incorporated as modules in a host 145 utilizing APACHE or NGINX web servers. In each instance, the proxy 205 receives traffic (e.g., client requests and responses) from the clients 101, 105, which may then be passed on to the host 145, and receives traffic (e.g., host 145 requests and responses) from the host 145, which may then be passed on to the clients 101, 105. In some example embodiments, the proxy 205 is a HTTP(S) proxy that handles traffic (e.g., proxies HTTP/HTTPS traffic) between the host 145 and clients 101, 105. Thus, the proxy 205 may provide client access to functionality 122 of the host 145 such as dynamically generated web content, database resources, search index resources, ecommerce components, application programming interfaces (e.g., API 121), and so forth, over the network 120, but without exposing the host 145 directly to the clients.

In some example embodiments, the proxy 205 may also service client 101, 105 requests/responses directly and/or request/respond to the clients as part of its operation. As an example, the proxy 205 may perform request and/or response operations separate from the functionality 122 of the host 145 in response to one or more client requests/responses (e.g., such as when issuing a challenge to a client in response to a received API request or opening a WebSocket in response to a received API request for opening a WebSocket). Accordingly, the proxy 205 may determine an IP address associated with the client by examining an HTTP request/response path of an API request received from the client for transmitting a challenge, opening a WebSocket, and/or other operations. For example, the proxy 205 may examine a received API request for a client source IP address of the received API request and/or a destination IP address for any response to the received API request.

When a client (e.g., 101, 105) engages the host 145 through the proxy 205 to access the functionality 122 of the host 145, such as the API 121, the proxy 205 may receive a request from the client. For example, the proxy 205 may receive an API request for functionality 122 of the host 145 provided by the API 121 from an authorized application 215 on a non-malicious client 101. The proxy 205 may pass this API request to the host 145 in order to provide the non-malicious client 101 with host functionality 122. In turn, the proxy 205 receives a response from the host 145, which may be transmitted to the non-malicious client 101 to provide the non-malicious client 101 with functionality 122 of the host provided by the API 121. Alternatively, the proxy 205 may receive an API request from an unauthorized application 117 (e.g., on a malicious client 105) to access the API 121 of the host 145 (e.g., for illegitimate and/or malicious purposes). The proxy 205 and authorized application 215 are configured such that the proxy 205 may distinguish between API requests associated with authorized applications 215 and API requests associated with unauthorized applications 117 in order to permit clients (e.g., non-malicious client 101) using an authorized application 215 access to the host 145 for functionality 122 provided by the API 121 while denying clients (e.g., malicious client 105) using an unauthorized application 117 access to the host 145.

As described previously, an application may initiate API requests over HTTP with lightweight data-interchange formats such as WebSockets, JSON or XML. Accordingly, unlike requests for other features and functionality provided by the host, requests for content provided by APIs are typically not HTML nor does the client-side application necessarily have full JavaScript enabled, as would be the case with a typical web browser. As a result, options for the proxy 205 to monitor clients API request activities beyond raw request metrics (e.g., number and rate) at the IP level using traditional techniques are severely limited.

In order to assist the proxy 205 in authorizing client access to an API of the host, a software development kit (SDK) 225 is incorporated in an authorized client-side application 215 distributed to users. For example, a user may utilize the non-malicious client 101 to download the authorized client-side application 215 associated with a particular service and functionality 122 provided by the host 145 from an app store, the host, or elsewhere, and install the authorized application to the non-malicious client. When the user uses the authorized application 215, the authorized application may initiate one or more API requests to the API 121 of the host 145 for functionality 122 provided by the host.

Example embodiments of the SDK 225 and/or authorized application 215 may include one or more components including an encryption function, hasher, and an event listener. Generally, the encryption function is called to encrypt input data, the hasher is called to generate a hash of input data, and the event listener is configured to identify, detect and/or log one or more API events for processing by the SDK 225. In addition to these components, The SDK 225 may modify and/or generate a request and/or response based on an API event or provide the authorized application 215 with instructions to modify and/or generate a request and/or response based on an API event. As various implementation details may be left up to developers, example embodiments described herein serve to demonstrate several example implementations but may not encompass every possible implementation. For example, the event listener 220 may be incorporated within the authorized application 215 as a standalone component or within the SDK 225. Similarly, the SDK 225 may include a hash function or utilize a hash function incorporated as a standalone component within the authorized application. Some example embodiments for implementation of an event listener 220 are outlined below.

In some embodiments, the event listener 220 may be incorporated within the authorized application 215 and accessed by the SDK 225 rather than incorporated within the SDK itself. In an example embodiment, the SDK 225 may be provided to application developers such that they can develop authorized applications 215 for accessing functionality 122 provided by their hosts 145. For example, a game developer may incorporate the SDK 225 within an authorized version of their game application 215 for accessing online game functionality 122 on the game host 145 via the API 121. In instances where the authorized application 215 includes an event listener 220 that logs API events associated with authorized application function, a developer may provide the SDK 225 access to the event listener so that the SDK may monitor for (e.g., detect and/or read) API events logged by the event listener. API events may include the initiation of an API request and any response to the API request (e.g., received from a proxy 205 and/or host 145). In other words, the SDK 225 accesses the event listener 220 to identify API request and/or response activities associated with the authorized application 225. In other embodiments, the event listener 220 may identify one or more API events and call the SDK 225 in response to the one or more API events. In instances where the authorized application 215 does not include an event listener 220, the event listener 220 may be incorporated within the SDK 225 to monitor for (e.g., detect) API events associated with the authorized application 215. Whether the SDK 225 identifies an API event at the event listener 220, is called by the event listener 220 in response to an API event, or includes the event listener to identify API events, the SDK may modify and/or generate a request and/or response based on an API event. Alternatively, the SDK 225 may provide the authorized application 215 with instructions to modify and/or generate a request and/or response based on an API event.

The SDK 225 is configured to generate a form of authentication (e.g., token/credential/security element, hereinafter "token") that is transmitted to the proxy 205 for authenticating the non-malicious client 101 and thus providing the authorized application 215, once authenticated, with access to the functionality 122 provided by the host 145, such as the API 121. As described previously, an application may initiate API requests over HTTP(S) with lightweight data-interchange formats such as WebSockets, JSON or XML. Thus, for example, an API request may be an HTTP(S) request including JSON and/or XML code or to open a WebSocket for retrieving data via the API 121 of the host 145. The token generated by the SDK 225 may be transmitted in association with an API request initiated by the authorized application 215. For example, an HTTP header of an API request may be set with the token value. As an example, an API request may be an HTTP request including a header comprising the token value and including the JSON and/or XML code for retrieving data via the API 121 of the host 145. As another example, an API request may be an HTTP 1.1 request for a WebSocket that includes a header comprising the request to upgrade to WebSockets and the token value, and may also include JSON and/or XML code for retrieving data via the API 121 of the host 145; subsequent API requests may flow through the WebSocket (if opened) and include JSON and/or XML code. In other example embodiments, the token may be transmitted separately.

In one example embodiment, the token (form of authentication) comprises specific user and/or application data corresponding to a user and/or the authorized application. For example, the token may comprise user identification (UID) specific to the user (a unique user identifier), such as login information for the authorized application 215 or a user specific ID corresponding to the user. Thus, the UID may be a user name (e.g., ted212), an email (e.g., ted212@domain.com), a phone number (e.g., 555-555-5555), user/subscriber ID (e.g., 123456789) or other user specific information identifying the user of the authorized application 215 that is used for authenticating/verifying the API request. In other example embodiments, the UID may be device specific, such as a determined phone number, international mobile equipment identity (IMEI), media access control (MAC) address, etc. The UID may also be a combination of user specific and device specific identifying data. In some example embodiments, the SDK 225 may be provided with a UID as an input by the authorized application 215 (e.g., after user login with the UID). Thus, the authorized application 215 may determine and/or receive a UID as part of its operation and provide the UID to the SDK 225. In other example embodiments, the SDK 225 may be configured to read user login information and/or a specific user ID corresponding to the user from the authorized application 215 (e.g., as provided by the user at login or reported to/determined by the authorized application 215 based on the login information) and/or device specific information (e.g., from the non-malicious client 101) to determine the UID. For example, the SDK 225 may determine device specific information by querying the underlying operating system for specific system attributes and/or capabilities of the non-malicious client 101, the combination of which being indicative of a particular user device to serve as a UID or component of the UID.

In some example embodiments, the token comprises a timestamp corresponding to a time as known by the device. The inclusion of a timestamp, which can be easily determined by non-malicious clients 101 when generating a new token, prevents indefinite presentation of a same token (e.g., a stolen token) by malicious clients. Thus, the authorized application 215 may determine and/or receive a timestamp as part of its operation and provide the timestamp to the SDK 225. In other example embodiments, the SDK 225 may be configured to determine or read a timestamp as known by the authorized application 215 and/or by the non-malicious client 101. Example embodiments of the token may comprise other information, such as a version number of the authorized application, etc.

The SDK 215 may include a hash function and/or encryption function to better secure the token against abuse. For example, in one embodiment, the SDK 215 includes a hash function to generate a hash of the UID and/or timestamp. For example, the hash function may take the UID and timestamp as input, which are ran through a hashing function to generate a hash. Examples of hashing functions include, but are not limited to SHA256 or MD5. The resulting hash may be truncated to prevent the running of the hash through the hashing function in reverse to ascertain the inputs (e.g., as a malicious client 105 may do in order to mimic token generation at an unauthorized application 117). The hash may be truncated in a variety of ways, for example, the first X many characters of the hash may be selected, the last X many characters selected, every other character, or character selection based on a truncating function to select X many characters or even a variable number of characters. In one example, a SHA256 hashing function outputs a 65-character hash based on the inputs, which may include the UID and timestamp. In turn, the first 20 characters may be selected to truncate the hash—which prevents simple reversal of the hash to determine the inputs. The token may include the hash, e.g., as UID:Timestamp:Hash.

In some embodiments, the SDK 215 includes an encryption function to encrypt one or more components of the token and/or the token itself. For example, the encryption function may encrypt the hash and/or the truncated hash included within the token. Additionally, the token itself may then be encrypted. In order to encrypt data, the encryption function may include a public encryption key, which may be application specific. For example, the public encryption key may be selected by the authorized application 215 developer such that it can be updated as desired, and so that in instances where many applications are serviced by the proxy system, the breach of one application utilizing an SDK 215 does not affect others as they each may utilize different keys. In conjunction with the public key included with (or provided by a developer to) the SDK 225, a private key may be uploaded to the proxy 205 for decrypting data encrypted by the authorized application 215 and transmitted to the proxy. In one embodiment, the SDK 215 includes an RSA encryption function, and the keys are asymmetrical RSA keys, the SDK including a public RSA key for encrypting data and the proxy 205 including a private RSA key for decrypting the data.

As can be seen, specific implementation details may differ depending on developer preference and existing functionality of the authorized application 215. In one embodiment, the SDK 225 includes all functional components ascribed to it herein, including the event listener 220, to ease integration into existing applications a developer wishes to convert to authorized applications 215. Thus, for example, a developer may easily incorporate the SDK 225 into an existing application to distribute authorized applications 215 to clients. In such examples, the developer may incorporate the SDK 225 as a functional block within an existing application and provide the SDK with access (e.g., read-write) to the API request-response path of the application to distribute an authorized application 215 with minimal development time.

One example embodiment of the proxy 205 includes an authenticator 210, token verifier 217, whitelist 218, and blacklist 208. As described above, the proxy 205 receives API requests from clients 101, 105. When the proxy 205 receives an API request (e.g., over HTTP) from a client, 101, 105, the authenticator 210 inspects the received API request. For example, the authenticator 210 checks a header of the received API request for any token and checks for an IP address associated with the client from which the API request was received. For example, the authenticator 210 may determine the IP address associated with the client/API request by examining an HTTP request/response path for the API request. In other words, the authenticator 210 may examine the API request for a source IP address of the API request and/or destination IP address for any response to the API request (e.g., a destination for a transmitted challenge) to utilize as an IP address associated with the client/received API request. If the IP address does not exist within the whitelist 218, but a token is identified in the header, the authenticator 210 may call the token verifier 217 to verify the token. If the token verifier 217 verifies the token, the authenticator 210 passes the API request to the host 145. The token verifier 217 may whitelist the IP address associated with a verified token by adding it to the whitelist 218, thus identifying that a token associated with the IP address was verified to allow future API requests to proceed through to the host 145. In turn, in some embodiments, the authenticator 210 may perform a simple initial check to determine whether the IP address associated with an API request exists within the whitelist 218. If the IP address exists within the whitelist 218, the authenticator 210 may pass the request through to the host 145. In some example embodiments, the authenticator 210 only passes the API request to the host 145 when the IP address is whitelisted (e.g., a token was previously verified for the IP address) and the API request also includes a token (e.g., the client presents the token with each API request).

In some example embodiments, the authenticator 210 may call the token verifier 217 to verify a token every time a token is presented in association with an API request. In some embodiments, the whitelist 218 includes a token store 219. Accordingly, when the token verifier 217 verifies a token, the token verifier may store the token in the token store 219 in association with the IP address associated with the API request within the whitelist 218. Thus, the token verifier 217 need not fully verify the token on every request when a token-IP pair exists in a whitelist 218 including a token store 219. Rather, the authenticator 210 passes the token-IP pair associated with an API request to the token verifier 217, which checks for a matching, existing IP-Token pair within the whitelist 218 including the token store 219. Should the IP-token pair associated with the API request not match an existing IP-token pair within the whitelist 218 and token store 219, the token verifier 217 may then proceed with the full verification process and add the IP-Token pair to the whitelist 218 including the token store 219 if the token is verified. The token store 219 can minimize average processing time taken by the proxy 205 for each request as only some require the full token verification process.

If the authenticator 210 identifies that the IP address associated with an API request is not whitelisted, and a token is not presented in association with the API request, or token verification fails—and thus the API request cannot be (or is not) authenticated for passing onto the host 145—the authenticator may challenge the client. The authenticator 210 may discard API requests that cannot be properly authenticated in order to protect the API 21 from unauthenticated access. In some embodiments, the discarding of API requests includes the discarding of API requests that cause or request the opening of a WebSocket where the API requests do not present a token and/or the verification of a presented token fails such that WebSockets are only opened for clients passing token verification. In one example embodiment, the authenticator 210 replies to an API request that cannot be properly authenticated with a non-standard response as a challenge. For example, the authenticator 210 may reply with an HTTP response that is non-standard (e.g., 418 HTTP response or other), where the challenge will be an indicator to the client device to provide a subsequent API request to retry the API request access. The non-standard HTTP response may include special HTTP headers, specific HTLM, JSON or XML text. In response to the challenge, an authorized application 215 will reply with a newly generated token in association with a subsequent re-attempted API request. Specifically, the event listener 220 and/or SDK 225 or the authorized application 215 itself identify the challenge by the non-standard response received from the proxy 205 and, in response, the SDK will generate a token to be provided in association with the re-attempted (or subsequent) API request(s) as a presented token. In turn, the authenticator 210 passes the presented token with the re-attempted (or subsequent) API request received from the client in response to the challenge to the token verifier 217 for verification to determine whether the API request can be passed to the host 145 (and/or to permit the opening of a WebSocket for access to the host 145 API). If the token verifier 217 indicates verification of the presented token (e.g., the token is valid) associated with an API request, the authenticator 210 permits the API request and passes or transmits the API request to the host 145 for servicing. If the token verifier 217 indicates the presented token cannot be verified (e.g., the token is invalid), the authenticator 210 may discard the API request and challenge the client again (e.g., up to a threshold number of allowed attempts).

In contrast, when the authenticator 210 challenges an unauthorized application 117, the unauthorized application 117 may not know how to deal with the challenge. Should the unauthorized application 117 retry the API request or attempt a different API request, which again lacks a token, a challenge is again presented, which perpetually fails the API requests originating from the unauthorized application 117. In other words, the unauthorized application 117 submits a subsequent API request in response to the denial/challenge; the subsequent API request is denied again for lacking a token and another challenge is transmitted back to the unauthorized application 117. This process repeats until a threshold number of attempts/requests are made that fail. The authenticator 210 may identify when a client (e.g., by IP address) has failed a threshold number of API request challenges, e.g., when a threshold number of API requests are received from the client IP address with no token (or includes an invalid token) having been presented, and block that client by IP address (e.g., in a blacklist 208). Thus, the authenticator 210 may determine when a client has reached the threshold number of allowed API request attempts without successful authentication and block the client by adding the IP address of the client to the blacklist. In some cases, the unauthorized application 117 may attempt to present a token. However, if the token cannot be verified by the token verifier 217, the IP address is not whitelisted nor is any IP-token pair stored within the whitelist 218 including the token store 219. Thus, if a whitelist 218 IP address check or a whitelist 218 and token store 219 IP-token pair check fails, and unauthorized application 117 API requests are again denied by the authenticator 210 (e.g., up to the threshold amount), the authenticator 210 may blacklist the IP address of the client after reaching the threshold number of allowed API request attempts. IP addresses blacklisted by the authenticator 210 may be stored in blacklist 208, which may be maintained by the proxy 205. Thus, in embodiments where the proxy 205 maintains a blacklist 208, the authenticator 210 may first determine whether the source IP address and/or destination IP address of a received request matches any IP address stored in the blacklist 208 prior to any token processing to immediately discard API requests associated with blocked IP addressed in response to a match.

The token verifier 217 verifies tokens presented with API requests. In some embodiments, tokens are encrypted, in which case the token verifier 217 includes an encryption key to decrypt the token. For example, the token verifier 217 may include a private key for decrypting information encrypted by the SDK 225 with a public encryption key. Once a token is decrypted, the token verifier 217 may perform a process similar to the SDK 225. For example, in a UID:Timestamp:Hash token format, the token verifier 217 may take the UID and timestamp as inputs to a hashing function to generate a hash. In turn, the token verifier 217 may compare the generated hash (e.g., generated with a same hashing function as the SDK 225) with the hash within the token and verify the token if the hash matches, or fail verification of the token if the hashes do not match. Additionally, the token verifier 217 may check a timestamp of a token against a current time (correcting for any time difference) to check the age of the token. If the timestamp is not approximately current (within a threshold) with the current time of the token verifier 217, the token verifier 217 may fail verification of the token (e.g., token has expired). In instances where the hash within the token is also encrypted by the SDK 225, the token verifier 217 may additionally decrypt the hash after decrypting the token and perform a match based on the decrypted hash. In example embodiments where the SDK 225 truncates hashes, the token verifier 217 also truncates the hash generated for verifying the token in a same fashion prior to performing the comparison. A match of the hash generated by the SDK 225 and the hash generated by the token verifier 217 ensures that the hash generated by the SDK was generated in a same (i.e., authorized) manner, such as with the same inputs, and optionally, a same truncation scheme, and encrypted with the correct key. In response to successful verification, the token verifier 217 may whitelist 218 an IP associated with the API request including the verified token and store the verified token within the token store 219 with an association to the IP address for future API request verification. Thus, on a future request, depending on the embodiment, the authenticator 210 need only identify a whitelisted IP in the whitelist 218 and/or the token verifier 217 identify a matching token associated with the whitelisted IP to identify an existing IP-Token pair within the whitelist 218 and token store 219 to authenticate an API request. The token verifier 217 may first decrypt a token prior to comparison and/or compare encrypted tokens (e.g., to reduce processing time) to identify existing IP-Token pairs, depending on the embodiment. Thus, for example, in some embodiments, the token verifier 217 may store encrypted versions of verified tokens within the token store 219.

The HTTP response challenge in combination with the token verification performed by the proxy 205 mitigates access to the host 145 by unauthorized applications 117 with minimal overhead at the proxy 205. Additionally, the SDK 225 provided to developers of authorized applications 215 minimizes overhead in development time of authorized applications for accessing the host 145.

To better protect the host 145 from unauthorized access to the API 121, the whitelist 218 and/or token store 219 may include one or more rules to expire tokens and IP addresses. In practice, the HTTP response challenge provides a first line of defense against unauthorized applications 117. If a client does not respond to an HTTP challenge with any token, in a subsequent API request or otherwise, the IP address of the client is not added to the whitelist 218, is blocked, and thus is denied access to the host 145 by the authenticator 210. Token verification provides a second line of defense against unauthorized applications 117. If a token is not generated in an appropriate fashion, it cannot be verified, and thus the IP address of a client presenting a token that cannot be verified is not added to the whitelist 218 or the token store 219. However, a user of a malicious client 105 may steal a token from a non-malicious client 101 utilizing an authorized application 215, which the malicious client 105 may then present in association with an API request from an unauthorized application 117 to trick the proxy 205 into authorizing the malicious client 105 access to the API 121. As a third line of defense, a time-to-live (TTL) scheme may be implemented within the whitelist 218 and token verification process. In some example embodiments the whitelist 218 includes a Time to Live (TTL) setting for expiration of added IPs based on elapsed time, thus only whitelisting an IP for a duration of time set by the TTL. Additionally, the token verifier 217 may include a TTL setting for verifying only current tokens. For example, the token verifier 217 may only verify a token if it is current, e.g., generated within the past 1-5 minutes or 5-60 seconds based on token timestamp compared to current time at the proxy 205, depending on the embodiment. Similarly, the whitelist 218 may purge IPs from the whitelist after 30-60 seconds or 1-5 minutes, or other TTL duration, depending on the embodiment. Additionally, in some example embodiments the whitelist 218 includes a request limit setting for expiration of added IPs based on number of requests serviced, thus only whitelisting an IP address for a configurable number of requests before the address is purged. The request limit may be initialized when the IP is whitelisted, and every check against the whitelist matching that IP counts against the request limit. When the request limit is reached, the whitelist 218 may purge the IP (even if the TTL has not yet expired). Thus, a client may be re-challenged once the IP address is purged to force the client to present a newly generated token (e.g., when the token includes a timestamp) in order to be whitelisted. The whitelist 218 may also purge any corresponding token of an IP-token pair for the IP address in a token store 219. Accordingly, a malicious client 105 must repeatedly steal tokens to gain access to the API 121 and cannot perform an excessive number of requests (e.g., to scrape the API 121) even in instances where access is gained momentarily. As a fourth line of defense, a per-request token check may be implemented, where the token verifier 217 verifies a token each time the token is presented. In some example embodiments the whitelist 218 includes a token store 219 for per-request verification to ensure that only one active IP-Token pair exists. In some example embodiments, the token verifier 217 stores verified tokens in association with IPs. In turn, the token verifier 217 may check for an existing IP-token pair within the whitelist 218 and token store 219. If a pair does not exist, the token verifier 217 may check to see whether the token exists in association with another IP, and only verify the token if it does not already exist as part of an IP-token pairing. Should an API request fail any check, the API request is denied and the client is challenged, which forces the client to present a valid API request (e.g., API request including a valid token that is not already in use) to gain access to the API 121 through the authenticator 210, or else the authenticator 210 continues to fail the API requests from the client. To defeat these measures, a malicious client 105 must determine how to generate the token and quickly defeat any hash function/encryption key updates to gain unauthorized access in any meaningful way, which presents a huge challenge to nefarious users attempting to gain access to an API 121.

In this way, HTTP challenges, along with a per-request token verification in conjunction with IP address TTL/request limit purging and verification for only recently generated tokens significantly increases the overhead a malicious user must take in order to gain unauthorized API 121 access, let alone scrape the host 145 API 121 or perform other unauthorized activities.

Figure 3:
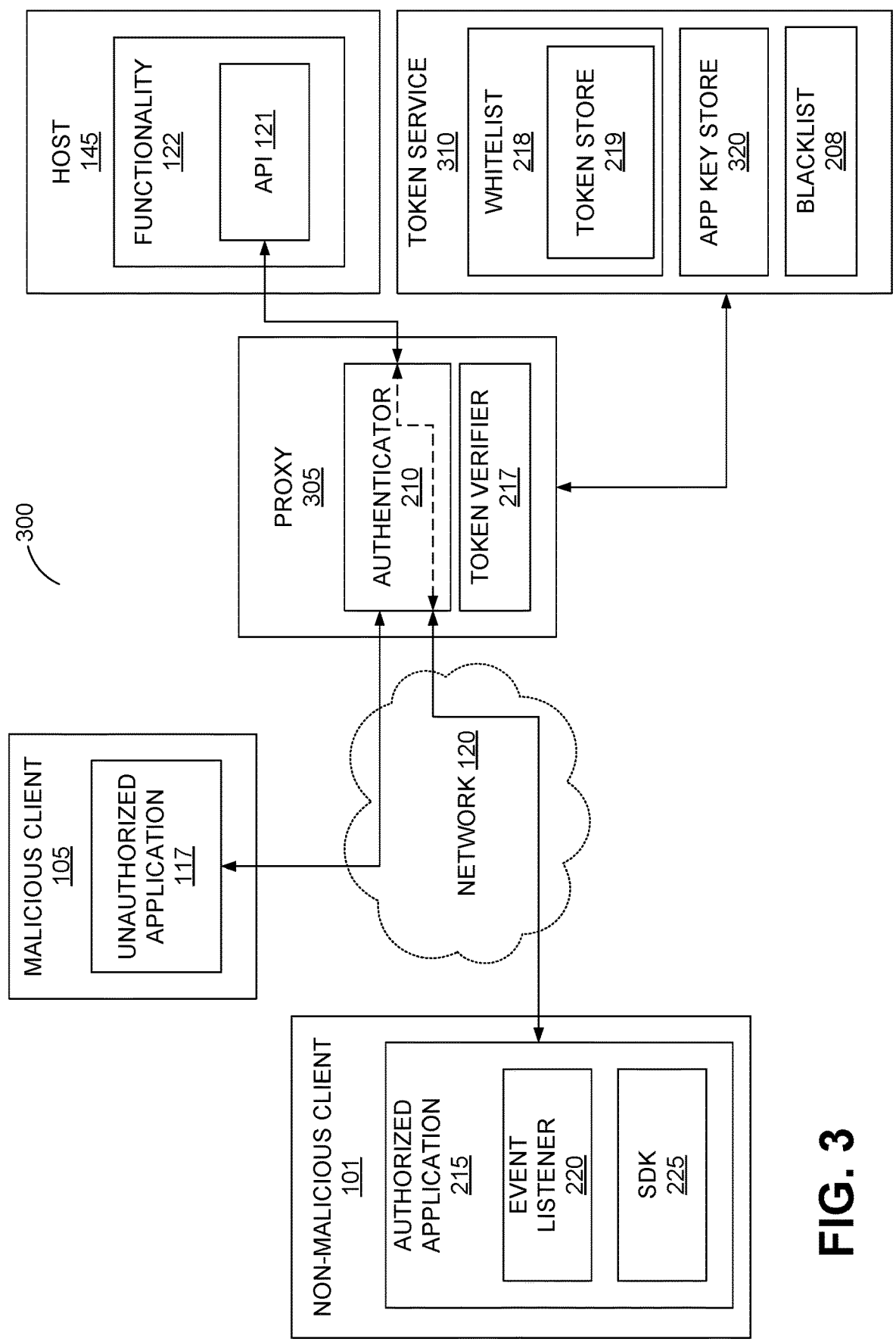
FIG. 3 illustrates a block diagram of an example communications environment including a proxy and token service for authenticating client access to an API of a host, according to one example embodiment.

Turning now to FIG. 3, it illustrates a block diagram of an example communications environment 300 including a proxy 305 for authenticating client access to an API 121 of a host 145, according to one example embodiment. In addition to the proxy 305 and the host 145, the environment 300 may also include non-malicious clients 101 and malicious clients 105 which communicate over network 120 with the host 145 through the proxy 305. Authentication of client access to the API 121 of the host 145 by the proxy 305 allows authorized applications 215 to access the API and mitigates access from unauthorized applications 117. In some example embodiments, the proxy 305 may be incorporated at a host and logically process traffic (e.g., as a pre-processing filter) prior to traffic being processed by the host.

Figure 2:
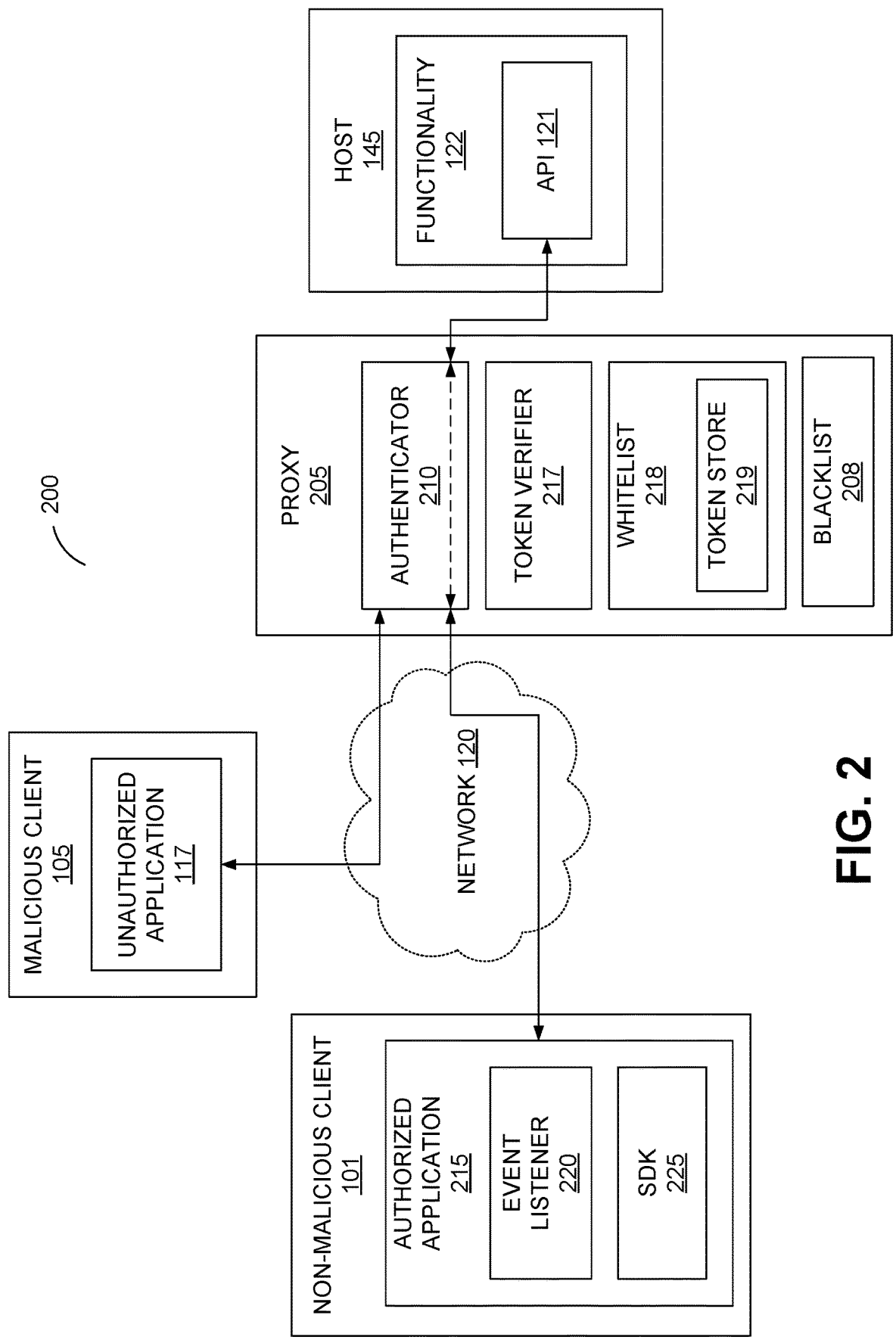
FIG. 2 illustrates a block diagram of an example communications environment including a proxy for authenticating client access to an application programming interface (API) of a host, according to one example embodiment.

The proxy 305 may handle traffic between a host 145 and clients 101, 105 in a manner similar to that previously described with respect to FIG. 2. For example, the proxy 305 may be a HTTP(S) proxy that handles traffic (e.g., proxies HTTP/HTTPS traffic) between the host 145 and clients 101, 105. Thus, the proxy 305 may provide client access to functionality 122 of the host 145 such as dynamically generated web content, database resources, search index resources, ecommerce components, application programming interfaces (e.g., API 121), and so forth, over the network 120, but without exposing the host 145 directly to the clients.

Over the system of FIG. 2, the system illustrated in FIG. 3 includes a token service 310 accessible by the proxy 305. Whereas the proxy (e.g., 205) of FIG. 2 was illustrated as storing one or more informational components locally, the proxy 305 of FIG. 3 shows an example embodiment where the proxy 305 accesses one or more the informational components in a distributed fashion. For example, the token service 310 may provide stored information to a plurality of proxy 305 instances in support of many authorized applications 215 and protecting the APIs 121 of various hosts 145 as described below.

As mentioned previously, a developer may select an encryption scheme and/or keys for encrypting and decrypting the information (e.g., tokens and/or hashes) sent by their authorization application 215. In an asymmetrical encryption key scheme, the authorization application 215 may include a public key for use by the SDK 225 to encrypt information such as tokens and hashes. In turn, the private key may be uploaded to the token service 310 within the proxy system and stored within the app key store 320. In this way, the app key store 320 may store private keys for decrypting information received from one or more different authorized applications 215 that was encrypted with corresponding public keys.

In the example embodiments illustrated in FIG. 3, when the proxy 305 receives an API request for processing by the authenticator 210, the authenticator may determine a destination API (e.g., API 121), the IP address associated with the client from which the API request was received and thus the API request, and any token presented (e.g., in the HTTP header of the API request). If a token is not presented (e.g., the API request lacks a token), the authenticator 210 may challenge the client that originated the API request to present a token with a subsequent API request. The authenticator 210 may discard API requests that do not include a token (or otherwise cannot be authenticated) in order to protect the API 21 from unauthenticated access. In some embodiments, the discarding of API requests includes the discarding of API requests that cause or request the opening of a WebSocket where the API requests do not present a token and/or the verification of a presented token fails such that WebSockets are only opened for clients passing token verification. When a token is presented, the token verifier 217 receives the IP address associated with the client/API request, token, and destination API as inputs from the authenticator 210 to verify the token with the token service 310.

In the example embodiments of the distributed system, the proxy 305 need not maintain persistent storage of encryption keys, whitelisted IP addresses, blacklisted IP addresses and/or tokens for IP-token pairs because storage is handled by the token service 310. Accordingly, in example embodiments where the token verifier 217 needs to decrypt a token and/or hash, the token verifier 217 may query the token service 310 with destination API information (e.g., for API 121) to retrieve an encryption key (e.g., a private key) associated with the API. In turn, the token verifier 217 may receive the private key associated with the API 121 to decrypt information that was encrypted with the corresponding public key by the SDK 225 of an authorized application 215 for the requested API 121.

The token verifier 217 may query the token service 310 with the IP-token pair associated with an API request to determine whether an existing IP-token pair is stored within the whitelist 218 and token store 219 by the token service 310. In some example embodiments, where the token is encrypted, the token verifier 217 retrieves an encryption key (e.g., by querying the token service 310 with the destination API information) to decrypt the token and query the token service 310 with the decrypted token. In other example embodiments, the token verifier 217 may query the token service 310 with an encrypted token.

The token service 310 may return a true/false response (e.g., Boolean or other indicator) for the IP-token pair query and additionally indicate true/false whether the token exists in the token store (e.g., is associated with a different IP address). If the token exists in the token store, but is associated with a different IP address (e.g., false:true response), the token verifier 217 may not verify the token. The token verifier 217 provides the verification result (e.g., not verified/false) to the authenticator 210. In response to the failed verification, the authenticator 210 may challenge the client as per an HTTP response challenge methods described herein.

If the IP-token pair exists (e.g., true:true/DNC), where DNC represents the action "Do Not Challenge", the token verifier 217 considers the token as verified. The true/DNC result arises for the token existing in the token store 219 check because if an IP-token pair exists, the token must also exist in the token store 219. As this check aims to determine whether a token exists in association with a different IP address it may be ignored or not undertaken by the token service 310 to reduce processing time after a "true" result for an existing IP-token pair because only one IP-token pair may exist per token/IP address. In turn, the token verifier 217 provides the verification result (e.g., verified/true) to the authenticator 210. In response to the successful verification, the authenticator 210 passes the API request to the host 145 and/or may open a WebSocket for API requests to open a WebSocket for host 145 API access.

If the IP-token pair does not exist and the token is not in the token store (e.g., false:false), the token verifier 217 proceeds with the verification process. The token verifier 217 may query for an encryption key based on the requested API if one has not yet been retrieved, depending on the example embodiment. In response to a false:false result and having received the private key associated with the requested API (e.g., API 121), the token verifier 217 may proceed with verification in a process similar to that previously described. For example, the token and/or hash is decrypted with the private key and the token verifier 217 checks a timestamp, generates a hash from the UID:timestamp, truncates the generated hash, and compares the generated hash against the hash in the presented token included in or with the API request (e.g., in the HTTP header of the API request). If the timestamp is current, and the hash matches, the token verifier 217 considers the token verified and passes the result to the authenticator 210. In turn, the authenticator 210 passes the API request for which the token is verified to the host 145 and/or may open a WebSocket for API requests to open a WebSocket for host 145 API access. Additionally, the token verifier 217 may transmit the verified IP-Token pair to the token service 310 with storage instructions for whitelisting the IP address in the whitelist 218 and storing the token in the token store 219 in association with the IP address to form an IP-token pair for future checks such that the proxy 305 need to proceed with the full verification process on one or more future requests for the API 121.

In some embodiments, the token verifier 217 may also specify the API for which the IP-token pair was verified for by providing information about the requested API such that the token service 310 may maintain IP-token pairs specific to a given API. In turn, for an IP-token check in some embodiments, the token verifier 217 may provide information about the requested API with the IP-token pair query to facilitate retrieval of an encryption key in instances of a false:false response. Additionally, because IP-token pairs may be API specific, the token verifier 217 may provide information about the requested API in IP-token queries such that the token verifier may look-up IP-token pairs specific to the requested API within the whitelist 218 and token store 219.

In some embodiments, storage instructions for a verified IP-token pair may include a Time to Live (TTL) and/or request limit for the IP address and/or IP-token pair to facilitate purging of the IP address from the whitelist or IP-Token pair from the token store. Alternatively, the token service 310 may maintain TTL and request limit settings for IP and/or IP-token pairs. For example, an administrator of the authorized application 215 and/or API 121 may modify the TTL and request limit settings for a particular API as well as provide a private encryption key.

The token service 310 may be a storage server, database, or other computing device for providing responses to queries received from the proxy 305 and storing information responsive to instructions received from the proxy 305. The token service 310 may also include logic to store configuration information including TTL and request limit settings specified by an administrator for a given API as well as any private keys for a given API. Embodiments of the token service 310 may also include a blacklist 208 for maintaining a list of blocked/blacklisted client IP addresses.

The whitelist 218 stores IP addresses responsive to instructions received from the proxy 305. The whitelist 218 may also include a token store 219 configured to store tokens response to instructions received from the proxy 305. The storage instructions may include a TTL and/or request limit to facilitate the purging of verified IP-tokens pairs, IP addresses and/or tokens. In addition, the storage instructions may indicate an API for which an IP address and/or token or IP-token pair was authenticated to access. Alternatively, the whitelist 218 may be configured with these parameters (e.g., by an administrator for a given API and/or globally for all APIs) such that they are set by the token service 310 when the proxy 305 instructs the token service 310 to whitelist 218 an IP address (or an IP-token pair, either of which may indicate the API for which the IP address and/or IP-token pair was authorized to access). The whitelist 218 may purge an IP address, token, and/or IP-token pair when the TTL expires, or respond "false" to a query received from the token verifier 217 if a TTL has expired and purge the IP address, token, and/or IP-token pair in response to a check. When an IP address is purged, the whitelist 218 may also purge any corresponding token in the token store 219.

In some embodiments, the blacklist 208 stores blocked IP addresses responsive to instructions received from the proxy 305. Thus, in embodiments where the token service 310 maintains a blacklist 208, the authenticator 210 may determine whether the source IP address and/or destination IP address of a received request matches any IP address stored in the blacklist 208 prior to any token processing to immediately discard API requests associated with blocked IP addressed in response to a match.

In an example embodiment where the token service 310 maintains a blacklist 208, the authenticator 210 may transmit the client IP address to the token service 310 with instructions to store the client IP address in the blacklist in response to a given client failing a threshold number of API request attempts (e.g., by failing challenges, token verification failing, etc.). In example embodiments, the authenticator 210 may determine when a client has reached the threshold number of allowed API request attempts without successful authentication and block the client by transmitting instructions to the token service 310 to store the IP address of the client in the blacklist 208. In turn, when the token service 310 is queried with an IP address or IP-token pair, the token service 310 may return a value indicating the IP address is blocked to the proxy 305 and the authenticator 210 immediately discards the associated request. In some embodiments, the proxy 305 maintains a count of failed attempts within the blacklist 208 by instructing the token service 310 to increase a failed request count associated with IP addresses in the blacklist 208. In turn, once the count reaches the threshold, the token service 310 may return a value indicating the IP address is blocked in response to a query or return the failed request count and the authenticator 210 discards a client request associated with an IP address having a count greater than the threshold. Verified client IPs (e.g., as part of a verified IP-token pair) may have an associated count purged or reduced as they were authenticated prior to reaching the failed attempt threshold. Various other schemes are also viable, such as pushing blocked client IPs to downstream elements, maintaining the blacklist 208 at the proxy 305 itself, etc. based on the desired implementation.

Example System Components

Figure 4:
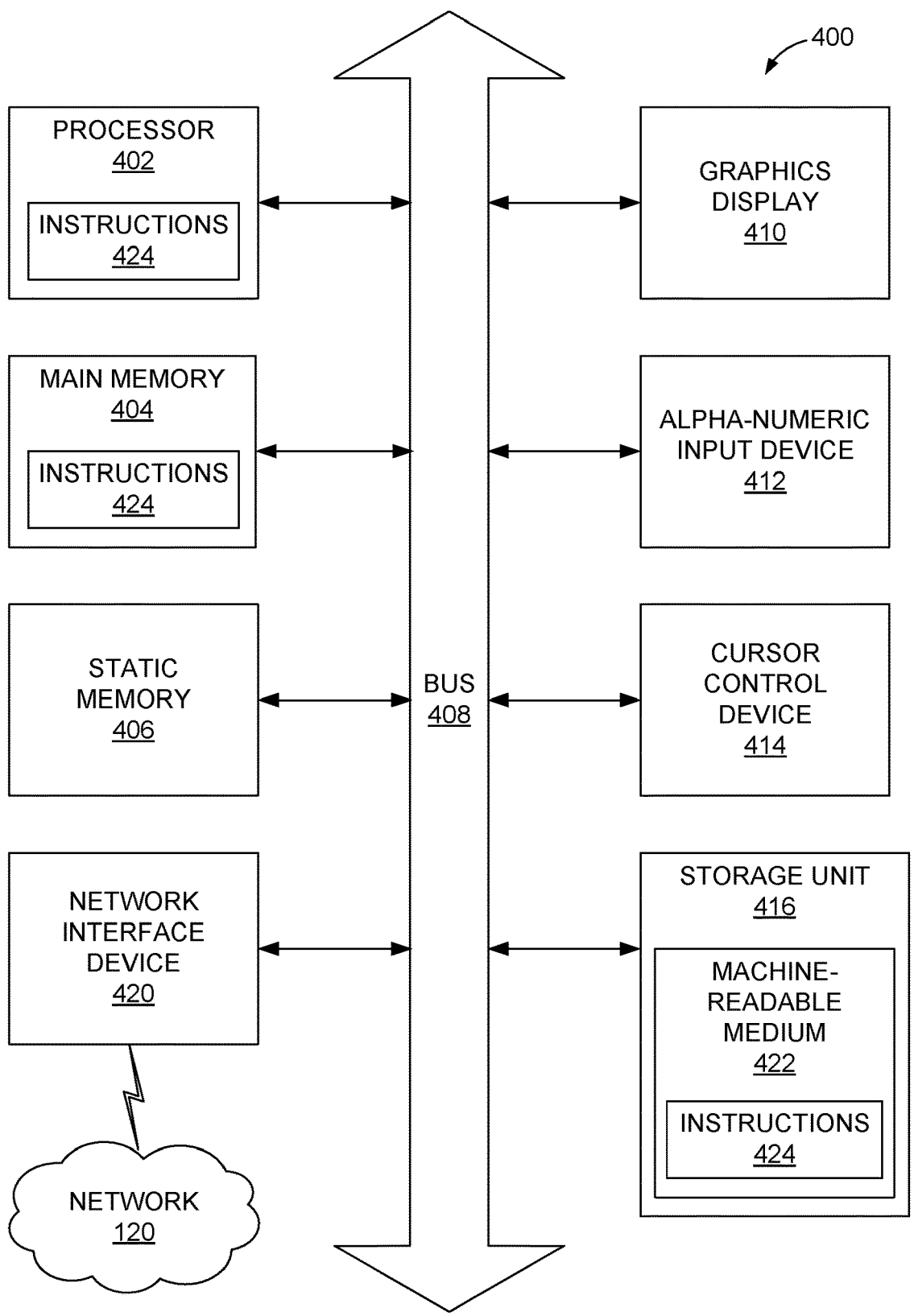
FIG. 4 illustrates an example architecture of a computing device, components of the architecture can correspond to components in embodiments of computing devices such as clients, hosts, and proxies.

FIG. 4 illustrates an example architecture of a computing device. Portions or all of the components of the architecture may correspond to components in embodiments of computing devices such as clients, host, token service, and/or proxy. As such, FIG. 4 illustrates components able to read instructions from a machine-readable medium and execute them on one or more processors (or controllers) to implement embodiments of the disclosed system for accessing or authenticating access to an API of a host, according to one example embodiment. For example, clients 101, 105, proxy server 205, 305, token service 310, and host 145, among other entities described herein may include one or more of the components illustrated in FIG. 4. Specifically, FIG. 4 shows a diagrammatic representation of a device in the example form of a computer system 400 within which instructions 424 (e.g., software or program code) that cause the device to perform any one or more of the methodologies discussed herein may be executed. In alternative embodiments, the device operates as a standalone device or may be connected (e.g., networked) to other machines. In a networked deployment, the device may operate in the capacity of a server device or a client device in a server-client network environment, or as a peer device in a peer-to-peer (or distributed) network environment. It is noted that the instructions may be part of a computer program product that may be stored in a non-transitory computer readable storage medium. The instructions may be executed by one or more processors.

The device may be a server computer, a client computer, a personal computer (PC), a tablet PC, a set-top box (STB), a personal digital assistant (PDA), a cellular telephone, a smart phone, a web appliance, an internet of things (IoT) device, a network router, switch or bridge, or any machine capable of executing instructions 424 (sequential or otherwise) that specify actions to be taken by that device. Further, while only a single device is illustrated, the term "device" shall also be taken to include any collection of device that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or the like. The computer system 400 may also include alphanumeric input device 412 (e.g., a keyboard—hardware and/or software based), a cursor control device 414 (e.g., touch screen response, a mouse, a trackball, a joystick, a motion sensor, or other pointing instrument), a storage unit 416, and a network interface device 420, which also are configured to communicate via the bus 408.

The storage unit 416 includes a machine-readable medium 422 on which is stored instructions 424 (e.g., software) embodying any one or more of the methodologies or functions described herein that may be executed by a processor 402 for device operation (e.g., client, host, proxy, and/or token service devices). The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 120 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the device (e.g., client, proxy, host and/or token service) and that cause the device to perform any one or more of the methodologies disclosed herein. The term "machine-readable medium" includes, but not be limited to, data repositories in the form of solid-state memories, optical media, and magnetic media.

Client Authentication

Figure 5A:
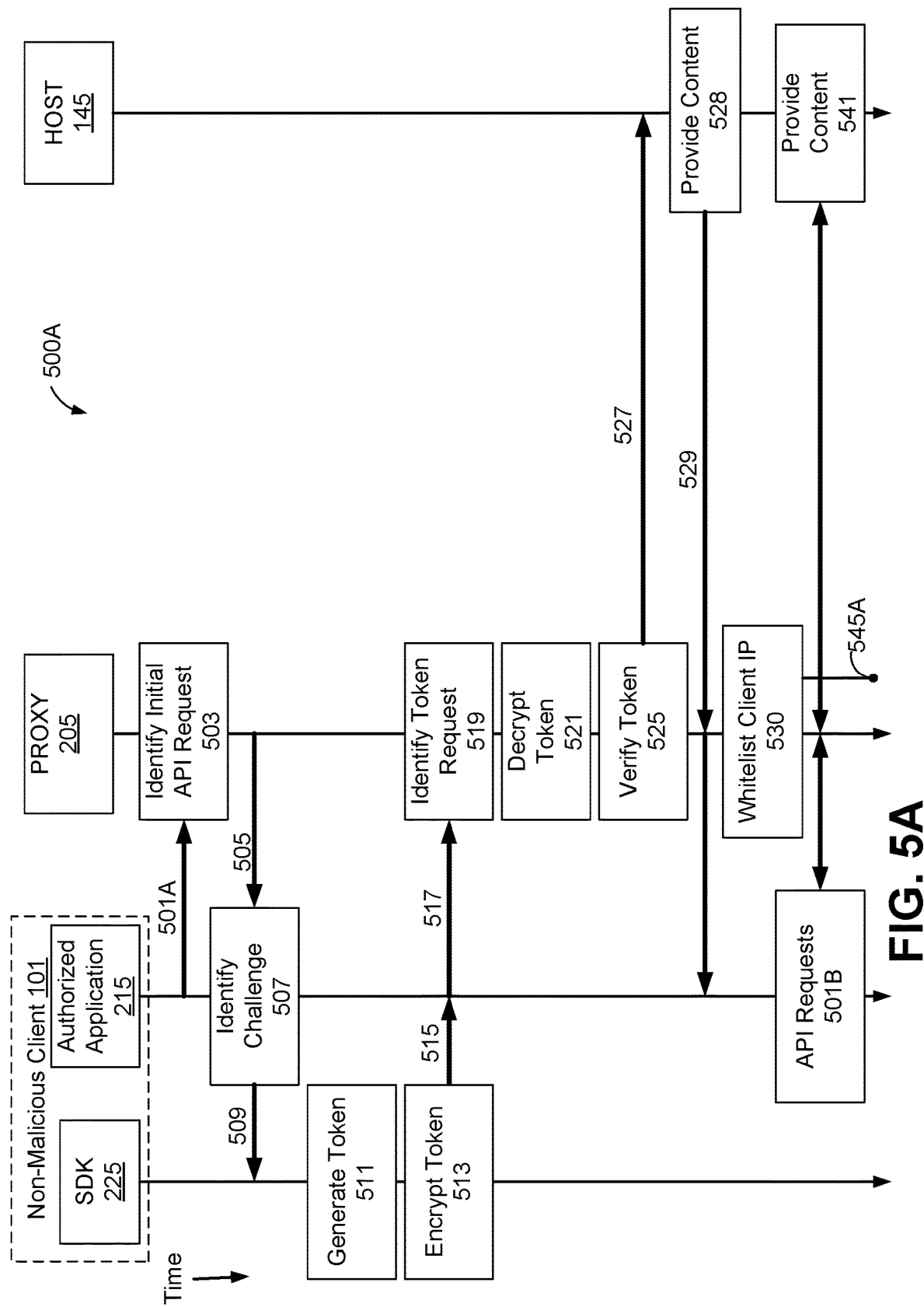
FIG. 5A, FIG. 5B, and FIG. 5C illustrate example event traces for authenticating client access to an API of a host with a proxy, according to various example embodiments.

FIG. 5A illustrates an example event trace for authenticating 500A client access to an API of a host with a proxy, according to an example embodiment. FIG. 5A shows a non-malicious client 101, proxy 205, and host 145. Each of these may be a computing device as described with reference to FIGS. 1-4. The client 101 as shown includes an authorized application 215 which may include an SDK 225 for generating a token.

The authorized application 215 may generate an API request 501A as part of its operation in order to retrieve content from the host 145, such as via an API of the host. Example API requests may include JSON or XML code for retrieving host API data and/or a HTTP 1.1 header to open a WebSocket for API access. The proxy 205 receives the API request 501A and identifies 503 the request as an initial API request based on the lack of any form of authentication within the request (e.g., the request lacks a token, a credential, a security element, or other form of verification, all of which are referred to as a token as previously stated). For example, the proxy 205 may check an HTTP header of the API request 501A for a token and identify 503 the request as an initial request based on the lack of a token within the header. In some embodiments, the proxy 205 may also consult a whitelist contain the IP addresses of clients having already presented a token and identify the API request 501A as an initial request because an IP address associated with the client 101 having originated the request is not present in the whitelist and a token is not presented with the API request. As the client 101 has not presented a token for verification and thus the proxy 205 does not authenticate the client, the proxy does not pass the API request 501A on to the host 145 or otherwise fulfill the request. As an example, API requests that do not include any form of authentication (e.g., lacks a token, credential, or otherwise cannot be authenticated due to an invalid token) may be discarded. In some embodiments, the discarding of API requests includes the discarding of API requests that request, cause, or involve the opening of a WebSocket.

In response to being unable to authenticate the client 101 due to the lack of any token or other form of authentication presented with the API request 501A, the proxy 205 issues a challenge 505 to the client 101. An authorized application 215 and/or SDK 225 will identify the challenge as a prompt to provide a token with one or more API requests. In some example embodiments, the challenge 505 may be an HTTP response to the received API request 501A. For example, the proxy 205 may provide a non-standard HTTP response 505 such as a 418 HTTP response code to the API request 501A as the challenge.

The authorized application 215 receives the challenge 505 and identifies 507 the challenge as an indicator to provide a token with an API request. The authorized application 215 calls 509 the SDK 225 to generate a token to provide with API requests. For example, the authorized application 215 and/or the SDK 225 may listen for a non-standard HTTP response 505 received from the proxy 205 in response to an API request 501A and identify 507 the non-standard HTTP response as a challenge to present a token.

The authorized application may call 509 the SDK 225 to provide a token for inclusion in a retry of the API request 501A. In response to the call 509, the SDK 225 determines attributes for the token, which may be provided by the application 215 as inputs, and generates 511 the token. Token attributes may include a UID, timestamp, and hash of the UID and timestamp. The hash may be truncated and/or encrypted. Example token format may be UID:Timestamp:Hash (where the hash may be optionally truncated and/or encrypted or otherwise obfuscated). In turn, the token, e.g., the "UID:Timestamp:Hash" string, is encrypted 513 to generate an encrypted token. The SDK 225 may call an encryption function to encrypt 513 the token with a public encryption key. The SDK 225 encrypts the token 513 and provides the token 515 to the authorized application 215 for inclusion in API requests. For example, the application 215 and/or SDK 225 may set an HTTP header in one or more API requests with the values of the encrypted token. In either instance, when the application 215 generates an API request 517 subsequent to receiving the challenge 505, the API request includes the token (e.g., as a string of encrypted values in the HTTP header).

The proxy 205 receives the API request including the token 517 and identifies 519 the request as a tokened request. For example, the proxy 205 may identify 519 the token in the HTTP header of the API request 517. The proxy 205 may check a whitelist for the presence of an IP address associated with the client 101. If the IP address of the client 101 does not exist in the whitelist, the token has not yet been verified, the client IP address has changed, or the client IP address has been purged from the whitelist. In each instance, the proxy 205 proceeds to verify 525 the token. If the token is encrypted, the proxy 205 decrypts 521 the token and any separately encrypted information within the token (e.g., the hash).

The proxy 205 verifies 525 the token by first checking to see if the decrypted token has attributes in the correct format, (e.g., UID:Timestamp:Hash). If an invalid encryption key or different encryption algorithm was used, the decrypted token will be unreadable. Second, the proxy 205 may verify 525 the token by checking the timestamp of the token against a current time. If the timestamp of the token exceeds a permitted time limit for verifying a token after generation, the proxy 205 does not verify the token. Third, the proxy 205 generates a hash from the UID and timestamp and performs any truncating function. If the hash generated by the proxy 205 from the UID and timestamp matches the hash generated by the SDK 225, then the token is verified, the client is authenticated, and the API request 617 is serviced. In turn, the proxy 205 passes 527 the received API request 517 having presented a verified token onto the host 145 for servicing, such that the host returns content 528 responsive to the API request of the authenticated client. In some embodiments, the proxy 205 opens a WebSocket responsive to the API request of the authenticated client. The proxy 205 passes received content 529 onto the client 101 for use by the authorized application 215.

In addition, embodiments of the proxy 205 may whitelist 530 the client 101 IP address to simplify future requests processing. Thus, for example, the proxy 205 may perform a check in the whitelist for the client IP address in response to subsequent API requests 501B. If the client IP address exists in the whitelist for an API request, the proxy 205 may pass the API request on to the host 145 to provide requested content 541 via the API. The proxy 205 may still check the HTTP header of an API request 501B for the presentation of a token and pass the API request 501B to the host 145 when the client IP address is also present in the whitelist.

In some example embodiments, the proxy 205 whitelists 530 the client IP with a TTL, which limits the authorization 545A period of client access to the API without presenting a new token to a configurable length of time. In some example embodiments, the proxy 205 whitelists 530 the client IP with a request limit which limits the authorization 545A period of the client access to the API without presenting a new token to a configurable number of requests. Upon reaching either a request limit of API requests 501B (e.g., tracked for each whitelist check for the IP address of the client) or TTL for an IP address, the proxy 205 may purge the IP address from the whitelist. In response to an API request where the IP address is no longer in the whitelist, the proxy 205 may challenge the client 101 to present a new token as if it were an initial request 503. In some embodiments, the application 215 presents a token with each API request (e.g., after an initial challenge) and updates the presented token in response to challenges received from the proxy 205 after purging of the IP address due to TTL/request limit being reached.

Figure 5B:
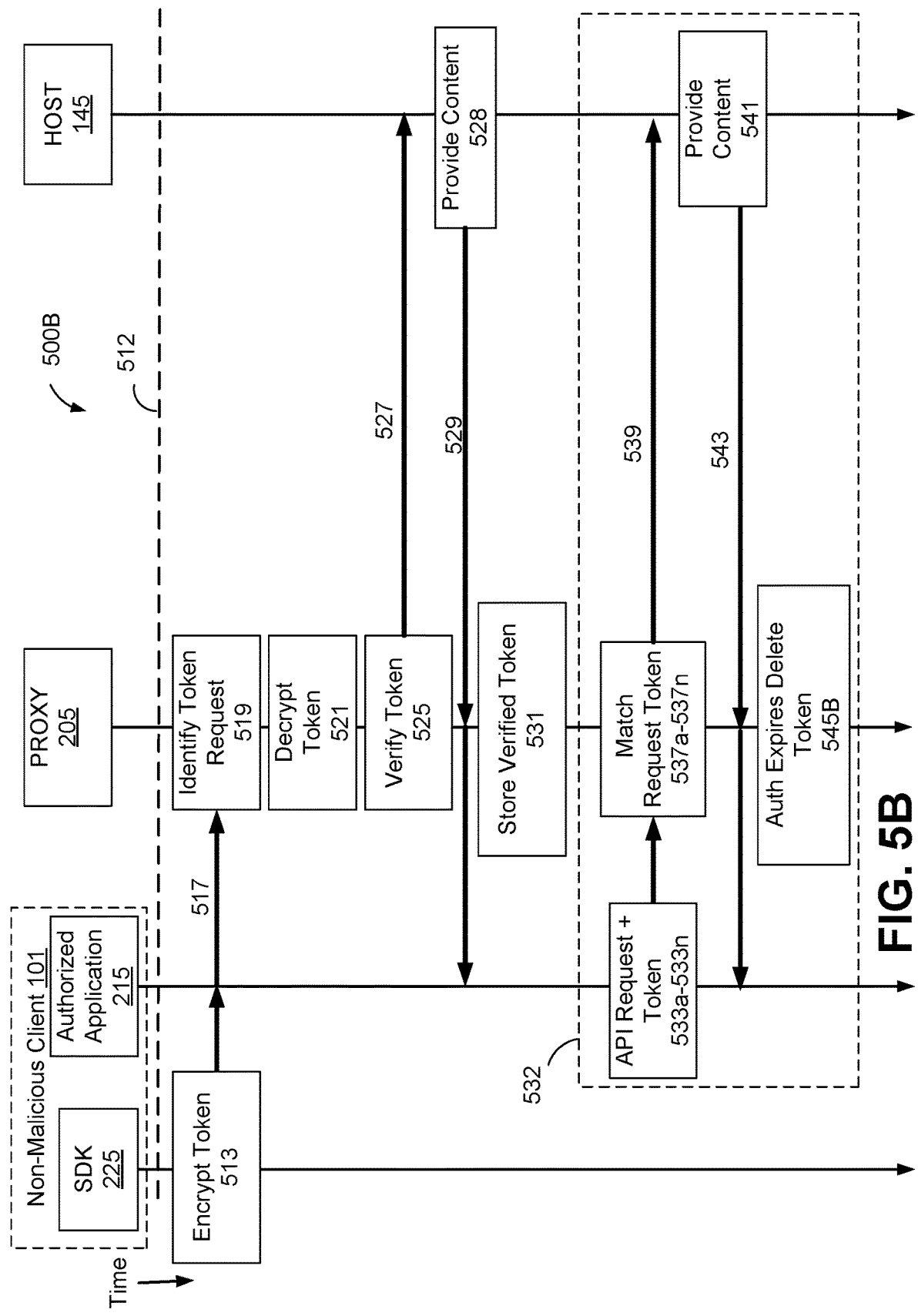

Turning now to FIG. 5B, it illustrates an example event trace for authenticating 500B client access to an API of a host with a proxy, according to an example embodiment. FIG. 5B shows a non-malicious client 101, proxy 205, and host 145. Each of these may be a computing device as described with reference to FIGS. 1-4. The client 101 as shown includes an authorized application 215 which may include an SDK 225 for generating a token. Line 512 indicates that example steps (e.g., 501-511 of FIG. 5A) occurring prior to SDK 225 encrypting 513 a token presented in an API request 517 are hidden for clarity.

The proxy 205 receives the API request including the token 517 and identifies 519 the request as a tokened request. For example, the proxy 205 may identify 519 the token in the HTTP header of the API request 517. The proxy 205 may check a verified token store for the presence of a matching token.

If a matching token does not exist in the verified token store, the token has not yet been verified or has been purged. In either instance, the proxy 205 proceeds to decrypt 521 and verify 525 the token. If the proxy 205 verifies 525 the token, then the client may be authenticated and the API request 617 serviced. In turn, the proxy 205 passes 527 the received API request 517 onto the host 145 for servicing, such that the host may provide content 528 responsive to the API request of the authenticated client. In some embodiments, the proxy 205 opens a WebSocket responsive to the API request of the authenticated client. The proxy 205 passes received content 529 onto the client 101 for the authorized application 215.

In addition, embodiments of the proxy 205 may store the verified token 531 for an authenticated client to simplify future requests processing 532. Thus, for example, the proxy 205 may perform a check in a verified token store for a token when it is presented in subsequent API requests 533 by the application 215. If the presented token included in an API request 533 matches 537 a verified token in the store, the proxy 205 may pass 539 the API request on to the host 145 for servicing to provide 543 requested content 541 via the API to the client 101.

In some example embodiments, the proxy 205 stores the verified tokens 531 with a TTL, which limits the authorization 545B duration of client access to the API with the verified token to a configurable length of time, after which the client must present a new token to gain access. In some example embodiments, the proxy 205 stores the verified tokens 531 with a request limit which limits the authorization 545B duration of client access to the API without presenting a new token to a configurable number of requests, e.g., 533a-533n. Upon reaching either a request limit of API requests (e.g., n number of requests) or TTL, the proxy 205 may purge the token from the verified token store. In response to an API request received after the TTL expires or after reaching the request limit, e.g., 533n+1, the proxy 205 may challenge the client 101 to present a new token as the token received with the API request is no longer verified and/or stored in the verified token store. For example, the proxy 205 may respond to API request 533n+1 with a non-standard HTTP response to challenge the client. In turn, the client 101 may perform example steps 507-511 shown in FIG. 5A and proceed through the process 500B again at line 512 with the SDK 225 encrypting 513 a newly generated token for presentation in a re-attempted API request of API request 533n+1. As the token is newly generated, the proxy 205 verifies the new token 525 and if the new token is verified, stores the new verified token 531 with newly initialized request limit and/or TTL. As such, the process 500B may repeat as described above to re-authenticate a client as authorization periodically expires due to token deletion 545B as request limit or TTL are reached.

Figure 5C:
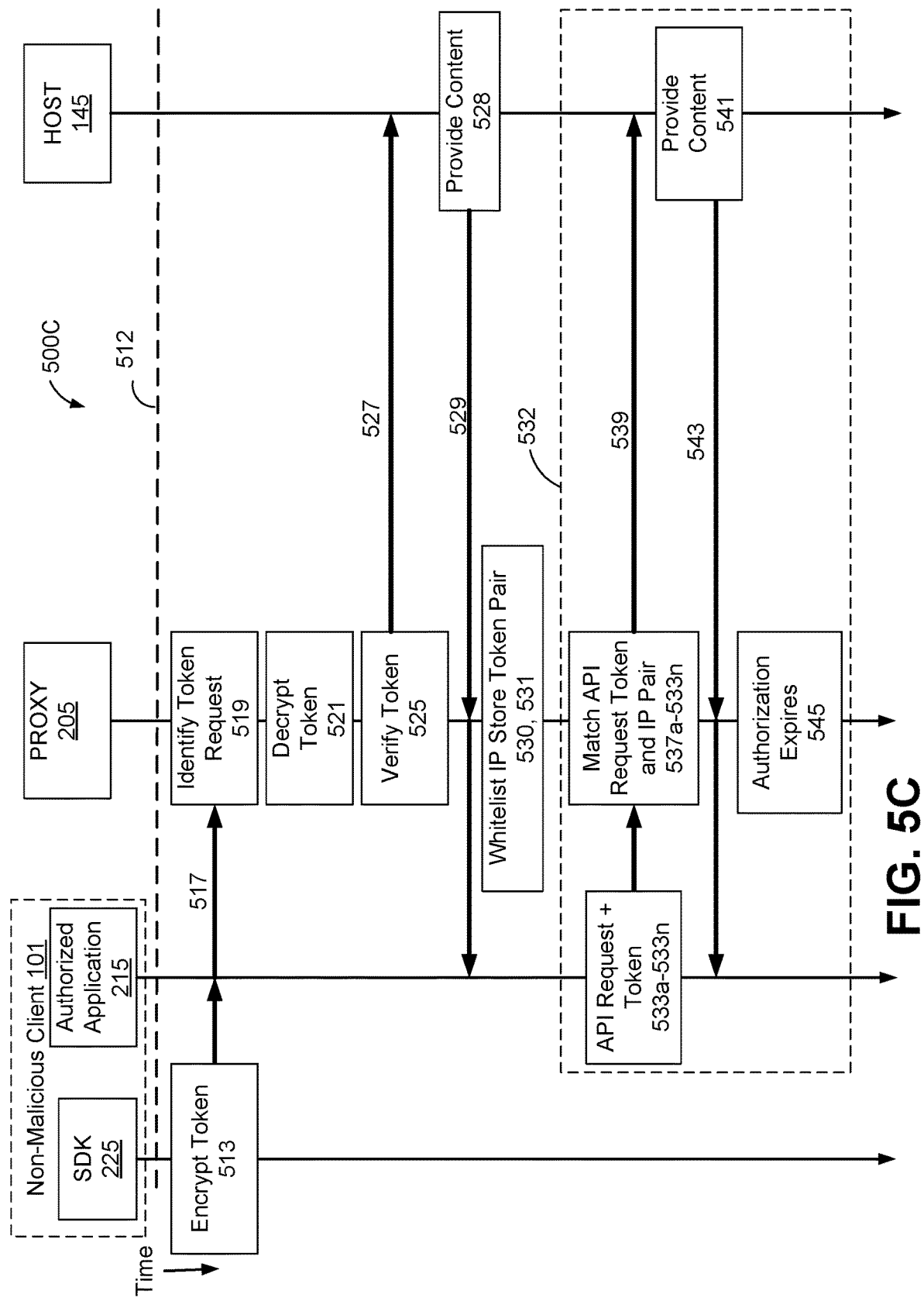

Turning now to FIG. 5C, it illustrates an example event trace for authenticating 500C client access to an API of a host with a proxy, according to an example embodiment. FIG. 5C shows a non-malicious client 101, proxy 205, and host 145. Each of these may be a computing device as described with reference to FIGS. 1-4. The client 101 as shown includes an authorized application 215 which may include an SDK 225 for generating a token. Line 512 indicates that example steps (e.g., 501-511 of FIG. 5A) occurring prior to SDK 225 encrypting 513 a token presented in an API request 517 are hidden for clarity.

The proxy 205 receives the API request including the token 517 and identifies 519 the request as a tokened request. The proxy 205 may check an IP whitelist and verified token store for an existing IP-Token pair of the client 101 IP address and token associated with the API request 517. Additionally, the proxy 205 may check the verified token store to see if the token was verified for another IP-Token combination.

If the token was verified for another IP-Token combination, the proxy 205 does not verify the token and may challenge the client 101. If the IP-Token pair does not exist, and the token has not been verified in conjunction with another IP, the IP-token pair has not yet been verified (or has been purged) and in either instance the proxy 205 proceeds to decrypt 521 and verify 525 the token presented by the client. If the proxy 205 verifies 525 the token, then the client may be authenticated and the API request 617 serviced. In turn, the proxy 205 passes 527 the received API request 517 onto the host 145 for servicing, such that the host may provide content 528 responsive to the API request of the authenticated client. In some embodiments, the proxy 205 opens a WebSocket responsive to the API request of the authenticated client. The proxy 205 passes received content 529 onto the client 101 for the authorized application 215.

In addition, embodiments of the proxy 205 may store the IP-token pair for an authenticated client to simplify future requests processing 532. For example, the proxy 205 may store the IP address of the client 101 in a whitelist 530 and store the token in a token store 531 with an association to the IP address. Thus, for example, the proxy 205 may perform a check on an IP-Token pair in the IP whitelist and token store for a verified IP-Token pair when a token is presented in subsequent API requests 533 by the application 215. If the token presented in an API request 533 and the IP address associated with the client 101 initiating the API request 533 matches 537 an IP-token pair in the whitelist and token store, the proxy 205 may pass the API request 539 on to the host 145 to provide 543 requested content 541 via the API.

In some example embodiments, the proxy 205 stores the IP-token pair with a TTL, which limits the authorization 545 duration of client access to the API on the IP address with the verified token to a configurable length of time, after which the client must present a new token to gain access. In some example embodiments, the proxy 205 stores the IP-token pair with a request limit which limits the authorization 545 of the client access to the API without presenting a new token to a configurable number of requests, e.g., 533a-533n. Upon reaching either a request limit of API requests (e.g., n number of request) or TTL, the proxy 205 may purge the IP-token pair from the IP whitelist and verified token store. In response to an API request received after the TTL expires or after reaching the request limit, e.g., 533n+1, the proxy 205 may challenge the client 101 to present a new token as the IP-token pair associated with the API request are no longer verified and/or stored. For example, the proxy 205 may respond to API request 533*n*+1 with a non-standard HTTP response to challenge the client. Once the proxy 205 issues a challenge, the client 101 may perform example steps 507-511 shown in FIG. 5A and proceed through the process 500C again at line 512 with the SDK 225 encrypting 513 a newly generated token for presentation in a re-attempted API request of API request 533*n*+1. As the token is newly generated, the proxy 205 verifies the new token 525 and if the new token is verified, stores the IP address 530 of the client and newly verified token 531 pair with newly initialized request limit and/or TTL. As such, the process 500C may repeat as described above to re-authenticate a client as authorization periodically expires 545 when request limit or TTL are reached. Similarly, if the IP of the client changes, then an IP-token pair no longer matches a verified IP-token pair stored in the IP whitelist and verified token store, but the token still matches a stored token. To prevent multiple clients from using a same token across multiple IP addresses, the proxy 205 may also present a challenge in this instance to force the client to present a newly generated token in order to authenticate on the new IP address.

Turning now to FIG. 6, it illustrates an example event trace for authenticating 600 client access to an API of a host with a proxy and token service, according to an example embodiment. FIG. 6 shows a non-malicious client 101, proxy 305, token service 310, and host 145. Each of these may be a computing device as described with reference to FIGS. 1-4. The client 101 as shown includes an authorized application 215 which may include an SDK 225 for generating a token. Line 612 indicates that example steps (e.g., 501-511 of FIG. 5A) occurring prior to SDK 225 encrypting 613 a token presented in an API request 617 are hidden for clarity.

The proxy 305 receives the API request including the token 617 and identifies 619 the request as a tokened request. The proxy 305 may query 620 the token service 310 with the IP address and token associated with the API request 617 to check an IP whitelist and verified token store maintained by the token service 310 for an existing verified IP-Token pair. Additionally, the check may also indicate whether the verified token store contains the token but that the token was verified for another IP-token pair combination. This check is performed in order to prevent multiple clients on different IP addresses from using a same token. The token service returns 620 the results of the check to the proxy 305. If the token was verified for another IP-Token combination, the proxy 305 does not verify the token and may challenge the client 101. If the proxy 305 needs to decrypt the token 621 to perform the check, it may query 622 the token service 310 for an encryption key (e.g., a private key for decrypting data encrypted 613 with a corresponding public key by the SDK 225) associated with the API of the host 145 targeted by the API request 617. Likewise, if the IP-token pair does not exist, and the token has not been verified for another IP, the token and IP-token pair has not yet been verified or has been purged. In either instance, the proxy 305 proceeds to decrypt 621 and verify 625 the token. As described above the proxy 305 may query 622 the token service 310 with information about the API targeted by the API request 617 to retrieve the private key for decrypting 621 token information. In some embodiments, the query 620 with the IP-token pair includes information about the targeted API such that the token service 310 may return a private encryption key with the IP-token pair query result. In turn, the proxy 305 may verify 625 the token (e.g., as described in FIGS. 5A-5C for verification step 525). If the proxy 205 verifies 625 the token, then the client may be authenticated and the API request 617 serviced. In turn, the proxy 305 passes 627 the received API request 617 onto the host 145 for servicing, such that the host can provide content 628 responsive to the API request of the authenticated client. In some embodiments, the proxy 205 opens a WebSocket responsive to the API request of the authenticated client. The proxy 305 passes received content 629 onto the client 101 for the authorized application 215.

In addition, embodiments of the proxy 305 may provide storage instructions with the verified IP-token pair to the token service 310, which stores 630 client IP address in a whitelist with an association to the token in a verified token store responsive to the storage instructions to simplify future requests processing 632. For example, the token service 310 may store the IP address in a whitelist and store the token in a token store with an association to the IP address such that subsequent requests including the same IP-token pair may be indicated as verified. Thus, for example, the proxy 305 may perform a query 638 to the token service 310 with an IP-token pair from subsequent API requests 633 by the application 215 to check for a match between the IP-token pair in a subsequent API request and a verified IP-Token pair maintained by the token service 310. If the token service 310 response 638 to the query indicates a match 637 and thus that the client is authenticated to access the host 145, the proxy 305 may pass 639 the API request 633 on to the host 145. In turn, the proxy 305 receives and passes 643 content provided 641 by the host 145 via the API to the authenticated client 101.

In some example embodiments, the instructions to store the client IP-token pair 630 include a TTL, which limits the authorization 645 duration of client access to the API on the IP address with the verified token to a configurable length of time, after which the client must present a new token to gain access. In some example embodiments, the instructions to store the IP-token pair 630 include a request limit which limits the authorization 645 of the client access to the API without presenting a new token to a configurable number of requests, e.g., 633*a*-633*n*. In other embodiments, these parameters may be configured at the token service 310. Upon reaching either a request limit of API requests (e.g., n number of requests) which may be tracked by the token service 310 based on the number of received queries for a given verified IP-token pair or TTL, the token service 310 may purge the IP-token pair from the IP whitelist and verified token store. Thus, for example, in response to an API request, e.g., 633*n*+1, the proxy 305 may challenge the client 101 to present a new token as the IP-token pair associated with the API request is no longer verified. Specifically, the proxy 305 queries 638 the token service 310 with the IP-token pair associated with the API request and the token service 310 indicates the IP-token pair is no longer verified and/or stored. In turn, the proxy 305 forces the client 101 to re-authenticate by presenting a new token with a re-attempted or subsequent API request in response to the challenge. For example, the proxy 305 may respond to API request 633*n*+1 responsive to the token service 310 indicating the IP-token pair is no longer verified with a non-standard HTTP response to challenge the client.

Once the proxy 305 issues a challenge, the client 101 may perform example steps 507-511 shown in FIG. 5A and proceed through the process 600 again at line 612 with the SDK 225 encrypting 613 a newly generated token for presentation in a re-attempted API request of API request 633*n*+1. As the token is newly generated, the proxy 305 verifies the new token 325 and if the new token is verified, instructs the token service 310 to store 630 the IP address and newly verified token pair. The newly verified IP-token pair may be stored 630 with newly initialized request limit and/or TTL. As such, the process 600 may repeat as described above to re-authenticate a client as authorization periodically expires 645 when request limit or TTL are reached. Similarly, if the IP of the client changes, then an IP-token pair no longer matches a verified IP-token pair stored 630 by the token service 310 in the IP whitelist and verified token store, but the token still matches a stored token. To prevent multiple clients from using a same token across multiple IP addresses, the proxy 305 may also present a challenge in this instance to force the client to present a newly generated token in order to authenticate on the new IP address. For example, the token service 310 may respond to an IP-token query received from the proxy 305 that the IP-token pair does not exist but the token exists (e.g., in association with a different IP address) and thus the client is required to present a new token to prevent multiple clients from using a same token across multiple IPs. The proxy 305 in turn may also present a challenge to the client in this instance so that the client must authenticate on the new IP address with a newly generated token.

Figure 7:
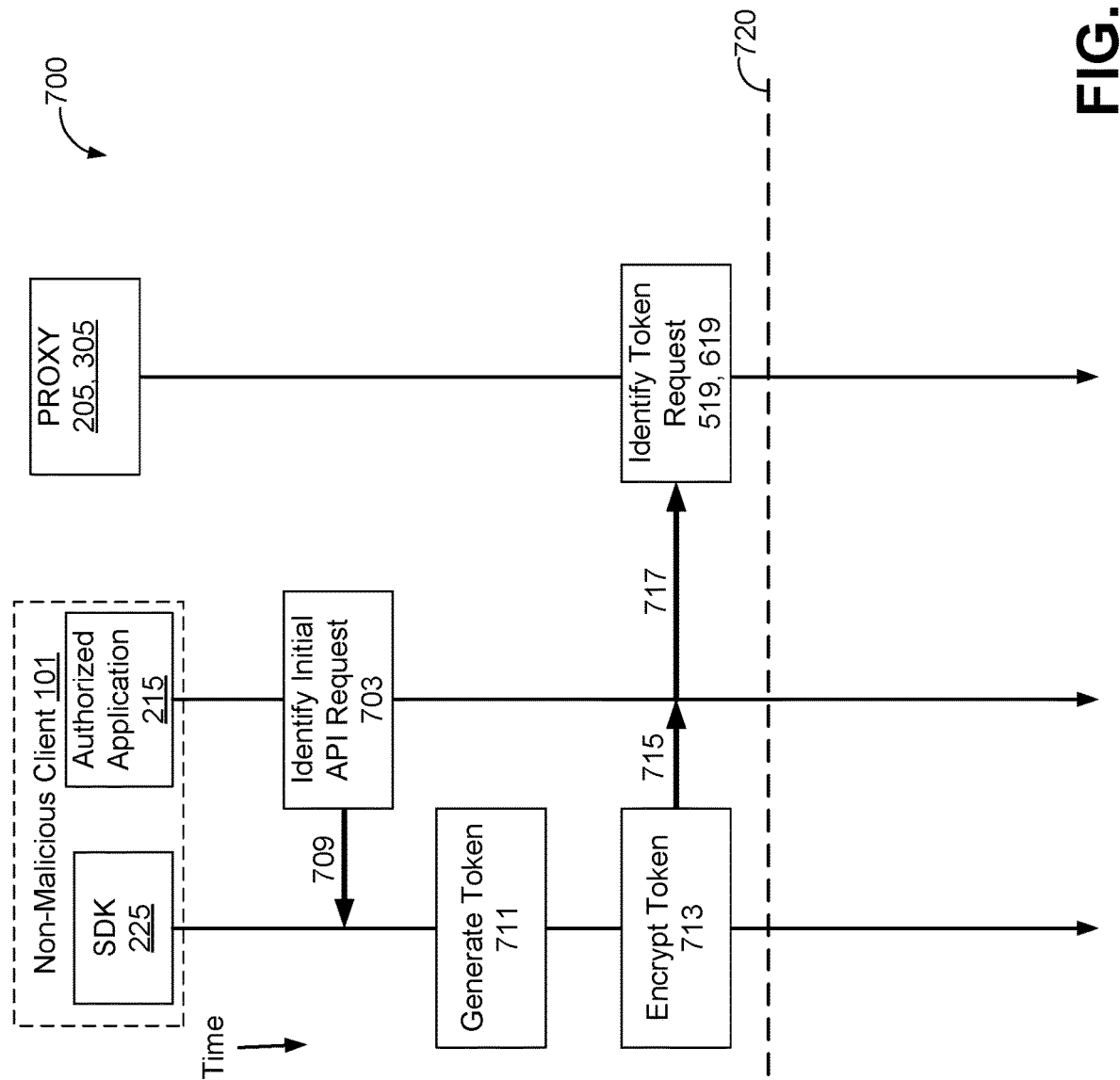
FIG. 7 illustrates an example event trace for generating a token for an initial API request to authenticate client access to an API of a host with a proxy, according to an example embodiment.

Turning now to FIG. 7, it illustrates an example event trace for generating a token for an initial API request to authenticate 700 client access to an API of a host with a proxy, according to an example embodiment. FIG. 7 shows a non-malicious client 101 and proxy 205 or 305. Each of these may be a computing device as described with reference to FIGS. 1-4. The client 101 as shown includes an authorized application 215 which may include an SDK 225 for generating a token. Line 720 indicates that example steps (e.g., 521-545 of FIGS. 5A-C or 620-645 of FIG. 6) occurring after identification 519, 619 of a tokened request are hidden for clarity.

In some embodiments, an authorized application 215 may identify when an initial API request 703 is generated. Specifically, the authorized application 215 may identify instances where a token has not been generated for inclusion with an API request, or is likely expired, and determines to generate a token for an API request to minimizing traffic overhead from proxy 205, 305 challenges. While the proxy 205, 305 may still challenge the client on occasion, the application 215 may preempt some challenges (and thus minimize authorization delay for API access) by generating a token on application launch, after x many requests to a host API to preempt request limit authorization expiration, every 30-60 seconds or every 1-5 minutes to preempt TTL limit authorization expiration, upon detection of an IP address change (e.g., from client switching from WiFi to Cellular signal), and so forth.

Accordingly, when the authorized application 215 identifies 703 an initial API request such as on application launch or otherwise when a token or updated token should be generated for inclusion with an API request, the authorized application calls 709 the SDK 225 to generate 711 a token. The SDK 225 generates 711 the token and encrypts 713 the token, which is provided 715 for inclusion in an API request 717. In turn, the proxy 205, 305 receives the API request with the token 717 and identifies (e.g., 519 or 619) the tokened request. Proxy 205 or 305 may then proceed as described with any one of FIGS. 5A, 5B, 5C, or FIG. 6, respectively, without having to challenge the client 101 in response an initial request or at other points in which the application 215 preemptively calls 709 the SDK 225 to generate 711 a new token for inclusion with API requests rather than wait until prompted by a challenge.

Additional Configuration Considerations

Through use of a system, method, and computer readable storage medium storing computer program instructions for authenticating client access to an API of a host with a proxy, unauthorized API access can be mitigated. Thus, by implementing proxy servers and/or authorized applications similar to those described herein the security and resilience of hosts to unauthorized API access can be improved.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms such as the authenticator, token verifier, whitelist, blacklist, token store, app key store, authorized application, event listener, SDK, API, etc. Modules may constitute either software modules (e.g., computer program code embodied on a machine-readable medium or in a transmission signal) executable by a processor or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 402) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIG. 1, 2, or 3 or with FIGS. 5A, 5B, 5C, 6 and FIG. 7) described herein may be performed, at least partially, by one or more processors (e.g., processor 402) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 404). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system, method, and computer readable storage medium storing computer program instructions for authenticating client access to an application programming interface of a host with a proxy through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for authenticating a client device to access an application programming interface (API) of a host device by a proxy, the method comprising:
    determining that a first API request lacks a form of authentication including lacking a token where the first API request cannot be authenticated due to not including the form of authentication, wherein the first API request is received from the client device;
    denying the first API request in response to the first API request lacking the form of authentication;
    transmitting a challenge to the client device in response to the denial of the first API request;
    determining that a second API request includes a presented token as the form of authentication, the second API request received from the client device;
    verifying the presented token of the second API request based on attributes of the presented token;
    in response to the presented token being verified, permitting the second API request; storing an IP-token pair comprising an internet protocol (IP) address of the client device stored in association with the presented token; and
    transmitting the permitted second API request to the host device for servicing.

2. The method of claim 1, wherein verifying the presented token based on attributes of the presented token comprises:
    generating, by the proxy, a first hash from one or more first attributes of the presented token;
    comparing the first hash to a second attribute of the presented token of the second API request; and
    verifying the token if the first hash generated by the proxy matches the second attribute, where the second attribute is a second hash generated by the client device.

3. The method of claim 1, wherein verifying the presented token based on attributes of the presented token comprises:
    decrypting the presented token with a private encryption key, the private encryption key corresponding to a public encryption key available to the client device for encrypting tokens;
    reading the attributes of the presented token in response to decrypting the presented token with the private encryption key; and
    verifying that the presented token is valid based on the attributes.

4. The method of claim 3, wherein the proxy authorizes client device access to a plurality of host APIs including the API of the host device and one or more other host APIs of the host device, the verifying of the presented token further comprising:
    determining the second API request is directed to a target host API from the plurality of host APIs;
    retrieving the private encryption key associated with the target host API; and decrypting the presented token with the second API request in response to retrieving the private encryption key associated with the target host API targeted by the second API request.

5. The method of claim 1, wherein verifying the presented token based on attributes of the presented token comprises:
   verifying a timestamp attribute of the presented token is within a threshold period of time from a current time; and
   verifying a truncated hash attribute of the presented token generated by the client matches a truncated hash generated by the proxy from one or more of the attributes of the presented token.

6. The method of claim 1,
   wherein the presented token comprises a credential or a unique identifier (i) associated with the client device or (ii) associated with a user of the client device that submitted the API request; and
   wherein attributes of the presented token comprise one or more of a unique user identifier, a timestamp, or a hash generated from one or more other attributes.

7. The method of claim 1, wherein the challenge transmitted to the client device includes at least an HTTP response, wherein the challenge is an indicator to the client device to provide a subsequent API request to retry the API request access.

8. The method of claim 1, further comprising, subsequent to the first API request being denied:
   inspecting a plurality of subsequent API requests received from the client device for a first presented token up to a threshold API request limit;
   in response to receiving a subsequent API request that lacks the first presented token, and the client device being below the threshold API request limit:
      (i) denying the subsequent API request from the plurality of subsequent API requests received from the client device in response to the subsequent API request lacking any token; and
      (ii) transmitting a subsequent challenge to the client device in response to the denial of the subsequent API request, wherein the subsequent challenge is an indicator to the client device to provide another subsequent API request;
   in response to receiving the subsequent API request that lacks the first presented token, and the client device having reached the threshold API request limit:
      blocking an Internet Protocol (IP) address associated with the client device in response to receiving the subsequent API request from the plurality of subsequent API requests that lacks any token; and
   in response to receiving the subsequent API request that includes the first presented token:
      verifying the first presented token based on attributes of the first presented token;
      permitting subsequent API request in response to the first presented token being verified;
      storing an IP-token pair comprising an internet protocol (IP) address of the client device stored in association with the first presented token; and
      transmitting the permitted subsequent API request to the host device for servicing.

9. A computer implemented method for authenticating a client device to access an application programming interface (API) of a host device by a proxy, the method comprising:
   inspecting a first API request received from the client device to determine if a form of authentication is included in the first API request;
   denying the first API request in response to determining that the first API request lacks the form of authentication including a token where the first API request cannot be authenticated;
   transmitting a challenge to the client device in response to the denial of the first API request, wherein the challenge is an indicator to the client device to provide a subsequent API request;
   inspecting a plurality of subsequent API requests received from the client device for a first presented token up to a threshold API request limit;
   in response to receiving a subsequent API request that lacks the first presented token, and the client device being below the threshold API request limit:
      (i) denying the subsequent API request from the plurality of subsequent API requests received from the client device in response to the subsequent API request lacking any token; and
      (ii) transmitting a subsequent challenge to the client device in response to the denial of the subsequent API request, wherein the subsequent challenge is an indicator to the client device to provide another subsequent API request; and
   in response to receiving the subsequent API request that lacks the first presented token, and the client device having reached the threshold API request limit:
      blocking an Internet Protocol (IP) address associated with the client device in response to receiving the subsequent API request from the plurality of subsequent API requests that lacks any token; and
   in response to receiving the subsequent API request that includes the first presented token:
      verifying the first presented token based on attributes of the first presented token;
      permitting subsequent API request in response to the first presented token being verified;
      storing an IP-token pair comprising an internet protocol (IP) address of the client device stored in association with the first presented token; and
      transmitting the permitted subsequent API request to the host device for servicing.

10. The method of claim 9, wherein the challenge transmitted to the client device includes at least an HTTP response.

11. The method of claim 9, wherein blocking the IP address associated with the client device prevents receipt of additional API requests over the threshold API request limit in response to the client device failing to produce the first presented token in association with any of the plurality of subsequent API requests.

12. A non-transitory computer readable storage medium storing computer program instructions configured for authenticating a client device to access an application programming interface (API) of a host device, the computer program instructions when executed by one or more processors of a proxy device causing the processors of the proxy device to:
   determine that a first API request lacks a form of authentication including lacking a token where the first API request cannot be authenticated, wherein the first API request is received from the client device;
   deny the first API request in response to the first API request lacking the form of authentication;
   transmit a challenge to the client device in response to the denial of the first API request;

determine that a second API request includes a presented token as the form of authentication, the second API request received from the client device;

verify the presented token of the second API request based on attributes of the presented token;

permit, in response to the verified presented token, the second API request; and store an IP-token pair comprising the internet protocol (IP) address of the client device stored in association with the presented token; and transmitting the permitted second API request to the host device for servicing.

13. The non-transitory computer readable storage medium of claim 12, wherein verifying the presented token based on attributes of the presented token comprises:

generating, by the proxy device, a first hash from one or more first attributes of the presented token;

comparing the first hash to a second attribute of the presented token of the second API request; and verifying the token when the first hash generated by the proxy device matches the second attribute, where the second attribute is a second hash generated by the client device.

14. The non-transitory computer readable storage medium of claim 12, wherein verifying the presented token based on attributes of the presented token comprises:

decrypting the presented token with a private encryption key, the private encryption key corresponding to a public encryption key available to the client device for encrypting tokens;

reading the attributes of the presented token in response to decrypting the presented token with the private encryption key; and verifying that the presented token is valid based on the attributes.

15. The non-transitory computer readable storage medium of claim 13, wherein the computer program instructions are configured to authorize client device access to a plurality of host APIs including the API of the host device and one or more other host APIs of the host device; and wherein the verifying of the presented token further comprising:

determining the second API request is directed to a target host API from the plurality of host APIs;

retrieving the private encryption key associated with the target host API; and decrypting the presented token with the second API request in response to retrieving the private encryption key associated with the target host API targeted by the second API request.

16. The non-transitory computer readable storage medium of claim 12, wherein verifying the presented token based on attributes of the presented token comprises:

verifying a timestamp attribute of the presented token is within a threshold period of time from a current time; and verifying a truncated hash attribute of the presented token generated by the client device matches a truncated hash generated by the proxy from one or more of the attributes of the presented token.

17. The non-transitory computer readable storage medium of claim 12, wherein the presented token comprises a credential or a unique identifier (i) associated with the client device or (ii) associated with a user of the client device that submitted the API request; and wherein attributes of the presented token comprise one or more of a unique user identifier, a timestamp, and a hash generated from one or more other attributes.

18. The non-transitory computer readable storage medium of claim 12, wherein the challenge transmitted to the client device includes at least an HTTP response.

19. The non-transitory computer readable storage medium of claim 12, wherein the challenge is transmitted as an indicator to the client device to provide a subsequent API request to retry the API request.

* * * * *